United States Patent
Koono et al.

(10) Patent No.: US 7,480,642 B2
(45) Date of Patent: Jan. 20, 2009

(54) AUTOMATIC KNOWLEDGE CREATING SYSTEM

(75) Inventors: Zenya Koono, Of Honfujisawa 2-13-5, Fujisawa-shi, Kanagawa (JP); Abolhassani Hassan, Chiba (JP); Hui Chen, Chofu (JP)

(73) Assignee: Zenya Koono, Fujisawa (JP)

( * ) Notice: Subject to any disclaimer, the term of this patent is extended or adjusted under 35 U.S.C. 154(b) by 66 days.

(21) Appl. No.: 10/478,980

(22) PCT Filed: May 27, 2002

(86) PCT No.: PCT/JP02/05117

§ 371 (c)(1),
(2), (4) Date: Jun. 16, 2004

(87) PCT Pub. No.: WO02/097727

PCT Pub. Date: Dec. 5, 2002

(65) Prior Publication Data

US 2004/0215586 A1 Oct. 28, 2004

(30) Foreign Application Priority Data

May 28, 2001 (JP) ............... 2001-159443

(51) Int. Cl.
*G06F 17/00* (2006.01)
*G06N 5/02* (2006.01)

(52) U.S. Cl. ..................................... 706/46
(58) Field of Classification Search ............ 706/46–47; 704/9
See application file for complete search history.

(56) References Cited

U.S. PATENT DOCUMENTS

| | | | | |
|---|---|---|---|---|
| 5,701,400 A | * | 12/1997 | Amado | 706/45 |
| 6,167,370 A | * | 12/2000 | Tsourikov et al. | 704/9 |
| 6,233,546 B1 | * | 5/2001 | Datig | 704/7 |
| 6,957,206 B2 | * | 10/2005 | Nolan | 706/47 |
| 2001/0014852 A1 | * | 8/2001 | Tsourikov et al. | 704/9 |

OTHER PUBLICATIONS

Abolhassani,H and Chen,H and Far,B and Koono,Z. "Software Creation: Detail of human design knowledge and it's application to automatic software design" Software Engineering Conference, 1999. (APSEC '99) Proceedings. Sixth Asia Pacific. IEEE. Dec. 1999.*

Larson,S and Watson,S and Rengarajan,K. "A framework-based approach to science software development" IEEE Aerospace Conference Proceedings. Mar. 2000.*

H. Kuroki, "Functionality of Integrated Case SoftDA and its Evaluation", Software Laboratories, Nippon Telegraph and Telephone Corporation, vol. 92, No. 10, 1992, pp. 15-25.

Caseworld, NEC, pp. 501-507.

(Continued)

*Primary Examiner*—David R Vincent
*Assistant Examiner*—Benjamin Buss
(74) *Attorney, Agent, or Firm*—Antonelli, Terry, Stout & Kraus, LLP.

(57) ABSTRACT

An automatic generation method, program and system to create knowledge, where a pair of parent concept and its children concept, decomposed from the parent concept, are used as elementary process knowledge, and by repeating decompositions of the elementary process knowledge to obtain detailed knowledge for achieving intention or design.

4 Claims, 29 Drawing Sheets

OTHER PUBLICATIONS

T. Yamada, "Software Creation: An Overview of Integrated Intelligent Case Tool", Department of Information and Computer Sciences, Faculty of Engineering, Saitama University, The Institute of Electronics, Information and Communication Engineers, Technical Report of IEICE, 2001, pp. 21-27.

S. Morimoto, "Software Creation: Graphical Processing of Design Information in Integrated Intelligent Case Tool" The Institute of Electronics, Information and Communication Engineers, Technical Report of IEICE, 2001, ISSN 0913-5685, vol. 100, No. 710, pp. 22-30.

O. Ohno, Automated Software Development Based on Composition of Categorized Reusable Components—Construction and Sufficiency of Skeletons for Batch Program, vol. J83, No. 10, 2000, 1055-1069.

Koono, et al., A New Way of Automatic Design of Software (Simulating Human Intentional Activity), Proc. Of Software Methodologies, Tools and Techniques 2006, pp. 407-420.

Koono, et al., "Automatic Acquisition Method of Design Knowledge and the Use to Automatic Design System", Application date: May 22, 1987, Published Date: Dec. 4, 1988, Japanese Patent Laid-open No. Hei 10-320188 (in Japanese).

Koono, et al., "Expert's Knowledge Structure Explains Software Engineering", Joint Conference on Knowledge-Based Software Engineering JCKBSE '96, Proc. Of JCKBSE, pp. 193-197, 1996.

Chen, et al., "Software Creation: An Intelligent Case Tool Featuring Automatic Design for Structured Programming", The Journal of IEICE, vol. E81-D, No. 12, pp. 1439-1449, Dec. 1998.

Abolhassani, et al., "Software Creation: A Study on the Inside of Human Design Knowledge", Journal of IEICE, vol. E83-D, No. 4, pp. 648-657, 2000.

Abolhassani, et al., "Software Creation: Cliché as Intermediate Knowledge in Software Design", Journal of IEICE, vol. E85-D, No. 1, pp. 221-232, Jan. 2002.

Abolhassani, et al., "Software Creation: Automatic Design by Rule-Based and Knowledge-Based Engines", Report of IPSJ SE 138-15, pp. 105-112, Jul. 2002 (in Japanese).

Abolhassani, et al., "Software Creation: Various Knowledge during Detailed Design", Proc. Of the 12$^{th}$ Annual National Conference of Japan Society fo Artificial Intelligence, pp. 9-10, 1998.

Abolhassani, et al., "Software Creation: Structure of Human Design Knowledge and it's Application to Automatic Software Design", Proc. Of the International CSI Computer Conference (CSICC), pp. 66-71, 1999.

Abolhassani, et al., "Software Creation: Structure of Human Design Knowledge for Hierarchical Detailing", Integrated Design and Process Technology IDPT 2000, in CD-ROM, 2000.

Zhan, et al., "Software Creation: Control Structure and the Evaluation of Integrated Intelligent Case Tool", Technical Report of IEICE, pp. 29-32, Mar. 2001.

Koono, et al., "Design Knowledge and Software Engineering", Wuhan University Journal of Natural Sciences, pp. 46-58, vol. 6, No. 1-2, Mar. 2001.

* cited by examiner

Sales voucher

| Customer name |  |  |  |
|---|---|---|---|
| Date |  |  |  |
| Sales number |  |  |  |

| Item | Qtty | Unit price | Subtotal |
|---|---|---|---|
|  |  |  |  |
|  |  |  |  |
|  |  |  |  |

Total

| Page number | Parent's input data | Parent's output dea | Misc. |
|---|---|---|---|
| 1 | Prefix shows unverified | dc | nil |
| 2 | Money voucher | Money DB | nil |
| 3 | Money voucher | Sales DB | nil |

AUTOMATIC KNOWLEDGE CREATING SYSTEM

TECHNICAL FIELD

The present invention relates to automatic creation of knowledge for human intentional activity, and not only that for the automatic design for systems and programs, but also automatic design of them, and also to the automatic generation of a program, as well as recording of the recorded media recording the program.

BACKGROUND ART

Automated design is now used in various fields. At present, in the most under-developed area of software, various automatic designs have been used for automating design processes, and thus it has been generally acknowledged that a design process may be automated by using the process knowledge of that design process. For that purpose, the systematic acquisition of design knowledge (hereafter, simply as design knowledge) and the systematic construction of the expert system using thus gained systematic knowledge, which is used for design of a system or a program, and this technology has also now being established. Furthermore, the technology for acquiring the design knowledge automatically as well as the automatic design reusing thus gained design knowledge has been established.

For your reference, an automatic acquisition system of the design knowledge and the automatic design system reusing it has been already published by Japanese Patent Publication, Japan Patent Laid-open No. Hei 10-320188.

As is shown later, the quantitative evaluation on this system proved to be very effective in the area of so-called maintenance design where the repetition is the majority. But, since it remains at a level of simple reuse, the system necessitates a human intervention for the selection of the better or the most suitable among the candidates if more than two candidates exist. This is the first problem of this system. It also has the second problem that it is impossible to create quite a new design knowledge automatically. In accordance with developments of new technologies, system developments and the automation of the development in the area of the upper phase such as treating management become a high technology spot.

Thus, the fundamental assignments of the present invention is to reveal the basic structure of the human design knowledge, and to build an expert system using the knowledge that can provide a high degree of automated design like an expertise human designer. In another word, it is the fundamental assignments of the present invention to reveal technologies for automatically creating design knowledge from more basic knowledge, to acquire design knowledge from automatic design or existing designs, and to accumulate thus gained knowledge for revealing and establishing the automatic design technology using thus accumulated knowledge, and further extend its application area to the top level early area of systems.

A 1st object of the present invention is an automatic generation method of design knowledge, the automatic design program and the automatic design system featuring the automatic creation of the design knowledge.

Moreover, a 2nd object of the present invention is to enable an automatic design that creates design knowledge automatically and to attain a high degree of automatic design.

Moreover, the 3rd purpose of the present invention is to enable an automatic design method capable of a high degree of automated design, by accumulating design knowledge which is created or acquired from existing documents, and by automatically selecting the most suitable design knowledge from the accumulated design knowledge based on the decision of the way of the design.

Moreover, the 4th purpose of the present invention is integration means of the automatic creation of the design knowledge as well as the reuse of the knowledge with drawing and display of documents, which have been the effective interface for users.

Moreover, the 5th purpose of the present invention is to attain a total system of the unified system concept applicable from programming to management level decision making by the above-mentioned terms.

DISCLOSURE OF INVENTION

In the present invention, a design is defined as all kinds of human activities for achieving the object, where the object itself or functions as decomposed from the object, is decomposed in concept to reach the implementation. And the knowledge needed for them is named as design knowledge.

In order to attain the above-mentioned purpose, the present invention is a method and the program for automatically creating knowledge for achieving a design using a pair of a parent concept and the children concept(s) as the elementary process knowledge. The present invention has a step to obtain the unit information group consisting of the skeleton (or framework) and the processing logic operating on the skeleton, where a skeleton has a verb in its center as decomposed from the aforementioned parent concept, and the second step for acquiring knowledge, which is the children or detailed concept from the parent concept or the intentional activity starting from the results gained in the first step.

Moreover, the present invention is the automatic creation method and the program for automatically creating the knowledge for achieving an intention or design, and it features to have a selection step choosing an appropriate knowledge for achieving an intention or design, namely to select one out of the children concept(s) as decomposed from the aforementioned parent concept, by the identification logic of the meaning of the verb in the parent concept, which is attained by referring to a group of information such as the input (hereafter, it includes the previous state) and the output (hereafter, it includes the previous state), both comprising the parent concept, and preceding parent(s).

Moreover, the present invention is an automatic creation method and the program for achieving intention or design using a pair of the parent concept and the children concept(s) as the elementary design process knowledge, furthermore, it has the first step for referring the unit information group which is composed of the processing logic of the skeleton and the skeleton of the children concept, and the main part of the skeleton is a verb being decomposed from the parent concept, and thus referred by the verb part of the parent concept, and it has the selection step of the appropriate one out of the unit information group, read out by the aforementioned referring step, where the selection is performed on the identification logic of the meaning of the parent verb by the input data, output data and the preceding parent concept(s), and they constitute to generate the design knowledge automatically, namely this is the automatic generation method as well as the program creating the design knowledge automatically.

Moreover, the present invention is a method to create the knowledge for achieving intention or design by using a pair of the parent concept and the children concept(s) as the elementary design knowledge, and it has the skeleton formation step for the data flow of the children concept based on the elementary data flow or the parent concept as the input, and it has the data flow formation step as the children concept, decomposed from the parent concept, by inheriting the verb in the parent concept or the verb in the children concept as decomposed from the parent concept, and they become the data flow or the children concept and the knowledge for achieving intention or design is created. This is the feature of the present invention.

Moreover, the present invention is a method of automatic generation or a program for the knowledge for achieving intension or design by using a pair of the parent and the children concept(s) as the elementary process knowledge, it has the data flow formation step for the decomposed children concept, based on the elementary data flow of the parent concept as the input, the skeleton of the data flow, which has the children and the parent relationship with the parent data flow namely the parent concept or the function in the parent concept, is inserted at least the input data or the output data of the parent concept, by the processing logic operating on the skeleton, or dedicated logic collaborating with the processing logic, and thus the data flow as the children concept hierarchically decomposed from the parent concept, or the knowledge is obtained.

Moreover, the present invention is an automatic generation method or a program, where an elementary design knowledge consisting of a pair of the parent concept and the children concept is used, based on the elementary data flow or the parent concept as the input, it has the step to form at least the skeleton of the data flow which is a decomposed concept of the parent concept data flow or the parent function, it has another step to form at least the children concept data flow by inserting the input data or the output data of the parent concept by means of the processing logic, operating on the skeleton, or the dedicated logic, and thus it features to obtain the knowledge for achieving intension or design in the form of a data flow which is the children concept hierarchically decomposed from the parent concept.

Moreover, the present invention is an automatic generation method and a program to generate knowledge for achieving intention or design, where an elementary design knowledge consisting of a pair of the parent concept and the children concept is used, it has the selection step of the skeleton, using the elementary data flow as the parent concept as the input, to select the appropriate one out of skeletons, one of which is the decomposed concept from the parent concept data flow or the parent function, and it has data flow formation step, based on the parent concept or the elementary data flow as the input, to insert at least the input data or the output data to the selected skeleton, which is chosen by the aforementioned selection step and has the unitary hierarchical relationship with the parent concept, by the processing logic operating on the said skeleton or the dedicated logic collaborating with the processing logic, and thus it completes the data flow or the child concept and outputs it, thus it features to obtain the data flow as the children concept knowledge decomposed from the parent concept.

Moreover, the present invention uses a data flow (diagram) and a flow chart or a structured chart. A data flow (diagram) consists of the input data, the function namely the conversion mechanism which converts the input data to the output data, and the output data. Each of these is the fundamental structure of the respective parts expressed by each diagram symbol accompanied by the respective description. Although a data flow (diagram), as a whole, shows the algorithm of the realization of a certain function, but the execution sequence of function(s) is not shown in the diagram. In the case of a flowchart and a structured chart, the elementary design information is a function, which constitutes fundamental structure of respective chart, and each of them has its diagram symbol with a description in it. Although a flowchart and a structured chart show the sequence of the execution of a function, the algorithm cannot be necessarily read (it is not understood).

Moreover, the present invention has a data flow (diagram) together with the corresponding flowchart or the structured chart. Starting point marks are set on the same corresponding functions in both documents, and these two starting point marks advance on each document synchronously and thus performs the automatic design. It has a following reference step to engines using the parent concept data flow consisting of the function with the starting point mark, the input data and the output data. In the engine block referred as explained before, the children concept, as decomposed from the parent concept, or the data flow with the corresponding flow chart or the structured chart are generated from the design knowledge in the aforementioned method, and the function of the above-mentioned parent concept in the data flow is pasted by the said child data flow, while the companion flowchart or the structured chart is pasted by the said children flow chart or the said structured chart, and these operations complete an elementary step of design, and it has the step to advance starting point marks to the next, and by repeating the aforementioned cycle, designs of the data flow as well as the companion flowchart or the structured chart are made, and this is the feature of this automatic design method.

Moreover, the present invention is an automatic design system of a pair of the parent concept and the child concept (group) as the elementary process knowledge for achieving an intention or design, and it consists of a knowledge base, where aforementioned elementary knowledge for achieving intention or design as mentioned before are accumulated, and an automatic generation unit creating the elementary knowledge for achieving intension or design, where from the unit information group consisting of the skeleton (or framework), including the verb as the main part and the processing logic, operating on the skeleton, the appropriate unit information is selected by a selection mechanism, which chooses by the meaning identification logic of the verb in the parent concept, and information such as the input data or the previous state, the output data or the post-state, both comprising the parent concept and the preceding parent(s) are used, and thus the knowledge is generated, and it has the selection means to switch the aforementioned automatic generation unit or the aforementioned design knowledge base to be used. Here, all the design rules used for the design are accumulated in the knowledge base.

Moreover, the present invention consists of knowledge base, which accumulates the elementary knowledge of the above-mentioned intention achievement or the design, and the reference unit, where the verb part of the function in the aforementioned parent concept is used for the reference, to obtain the unit information group, one of which consists of the skeleton and the processing logic operating on the said skeleton, the selection unit for choosing the appropriate one out of the unit information group read out by the aforementioned reference unit, where the selection is performed by the identification logic of the meaning of the verb using information such as the input or the previous state, the output or the post-state, both of the parent concept, and the preceding parent(s), thus the knowledge for achieving intention or design is created automatically in the automatic creation unit, and the system is provided with the selection unit to switch the said automatic generation unit or the said design knowledge base to acquire the elementary knowledge for achieving intention or design.

Moreover, the present invention consists of the knowledge base accumulating the elementary knowledge, which is a pair of a parent concept and the child concept (group), the rule base accumulating the elementary information group, one of which consists of the skeleton centering on a verb and the processing logic which acts on the skeleton, and the automatic generation unit for the knowledge for achieving intension or design, which reads out from the rule base the unit information groups, and chooses the necessary unit information by identifying the meaning of the verb in the parent concept by the input or the previous state, the output or the post-state and the preceding parent concept(s), and at every time the aforementioned automatic generation unit works, the output is compared with existing knowledge (group), in the aforementioned knowledge base, having the same verb, and thus found the duplicated part is acknowledged as a skeleton, the common pattern in the same meaning is extracted to form the processing logic, and thus gained results are stored in the said rule base.

Moreover, the present invention has the basic knowledge dictionary where definitions of various words, data and the structure are stored, elementary function logics referring the basic knowledge dictionary in both ways of the normal and the inverse ways to establish a relationship between them, the rule base which stores the unit information groups consisting of the verb centered skeleton decomposed from the parent concept and the processing logic operating on the skeleton, and the automatic generation unit, for creating the knowledge for achieving intention or design, from the read out unit information group from the aforementioned rule base, the dedicated logic and the said elementary function logic collaborate to create the knowledge for design.

Moreover, the present invention features to have the logic part in the aforementioned function logic, where a verb is extracted from the working knowledge used, and the output verb is accumulated on the said basic knowledge dictionary.

Moreover, the present invention consists of CASE tools consisting of data flow CASE tool and flowchart or structured CASE tool, engines for automatic generation, comprising of at least engine for the automatic generation of the knowledge and knowledge base which accumulates design knowledge generated by the aforementioned engine, and has communication means for transmitting and receiving between aforementioned CASE tools and the aforementioned engines Moreover, the present invention consists of the afore-mentioned CASE tools and the afore-mentioned engines. Moreover, both CASE tools each have identification means of the function for design works, and at each time of their operation, the operation on the data flow precedes and converts from the children data flow, decomposed from the parent, to the corresponding flowchart or structured chart and their drawings are made, and while in a case of a flowchart or structured chart in a design of a decision or a repetition precedes, and the design of data flow is inhibited to follow.

Moreover, the present invention use a pair of the parent concept and the children concept(s), which has the parent sending step where the tracing of unit graphic symbols starts from the parent concept symbol (with starting point mark) to capture information of each graphic symbols constituting the parent concept, and thus reproduced parent concept is sent out to engines, the first engine has the selection output for choosing the desired part of the referred part automatically from the retrieved outputs from knowledge base, which is referred by the logic to extract the meaning of the central concept of the parent concept, and the second engine has the output of the aforementioned automatic generation unit of the design knowledge, and it has the decision step for selecting the output of the first engine or the output of the second engine, and the last step to complete design diagrams to paste graphic symbols forming the children concept next to the graphic symbols denoting the parent concept.

Moreover, a design document in the present invention is a structural design document where from the most abstracted unitary design information grows a leg to more detailed unitary design information group which corresponds to the children, and each children repeat to extend their legs to own children. In this design diagram, a major walk starts from a unit graphic symbol, bearing design information, which is the parent of the hierarchical decomposition, it then traces, by tree walk, all the parent symbols (group) successively to acquire their information. Furthermore, there is the first minor local walk, where during the major walk scans parents successively, it walks around the children graphic symbols related to a parent and returns to the starting point, and thus acquired information is processes to acquire the design knowledge automatically.

Furthermore, there is the second minor local walk to perform automatic design (detailing operation). When a parent concept in a design document is specified, and also the design knowledge as a pair of the parent concept and the corresponding children concept is given, the children concepts in the form of graphic symbol(s) are pasted following to the parent symbol in the diagram.

Moreover, the present invention acquires design knowledge automatically, by tracing a diagram using a major walk, it acquires the unitary design information of parents, and there, a minor local walk starts and acquires the unitary design information on the children, and from these unitary design information groups the design knowledge as the hierarchical relationship of the parent and the children is reproduced and stored in knowledge base, from which design knowledge is automatically acquired.

Moreover, the present invention traces graphic symbols by the major walk, and during the walk it acquires the unitary design information of parents, and from the group of unitary information of parents the parent information is extracted, and they are sent to engines to gain the design knowledge. Engines send out the retrieved outputs or the outputs from various automatic design units where the design knowledge is the hierarchical parent and children relationship. During tracing the children's Fig.s, the automatic design, namely the automatic detailing is performed, by pasting the Fig. gained during the tracing to the next position of the parent in the document. During tracing the children's Fig.s, the automatic design, namely the automatic detailing is performed, by pasting the Fig. gained during the tracing to the next position of the parent in the document.

Moreover, the basic principle of automatic design in the present invention is explained as follows: to begin with, set a starting point mark on a parent function in the data flow diagram and do the same on the flowchart or the structured chart. Hereafter, both CASE tools work synchronously. The starting point mark moves to the next function then it triggers the local operation or the minor walk. At each local operation, the parent is sent out to integration unit (the coincidence of both parents are checked and confirmed), then it is transmitted to knowledge base and Creator CASE tool. One of engines (Knowledge base and Creator CASE tool) sends out the corresponding design knowledge. Integration unit transmits this to CASE tools, and each CASE tool receives respective design knowledge and performs to complete one cycle of each local operation, then starting point marks move to the next function and the next cycle is started. By repeating these drawing operations, the design continues until all the concepts reach at the most detailed level. The structure of the automatic generation unit of the design knowledge of the present invention is explained. At the input of Creator CASE tool (other engines like knowledge base), an accumulation mechanism is provided to store some of the incoming parent concepts are stored, and the input of several cycles ago may be read out. The input is supplied to an extraction logic part, where the parent concept is decomposed to the input and the output data together with the function, and the essential verb in the function is extracted. The input is supplied to function decoder for controlling an initiation sequence while the verb is used for referring to verb dictionary in the program. Generally, the referred output is one or more pages, as a verb has several meanings. In function decoder, there is a selection logic to decide the page out of the read out pages from verb dictionary, which is the most fitted meaning referring to DDFT. Verb dictionary takes frame type knowledge representation. Skeleton for data flow, flowchart or structured chart is taken as "data", while processing logic is "method" which describes the processing to complete the children concept with the skeleton. The simplest example is to connect the input data and the output data to the skeleton using particles in a model style statement like (Perform[verbXX] [1st object○○] [2nd object∆∆]) and thus the data flow as the children concept.

Jackson Structured Programming (JSP) is the most suitable way of design where both input and output are hierarchical. Function decoder has the dedicated logic for the purpose to decompose the input data and the output data hierarchically by referring to structure dictionary which may be defined by Structure chart CASE tool. As one example, a JSP unit tries to form a hierarchical data structure in both input side and the output side, inheriting a verb in the parent concept or the verb included in the skeleton, and thus form one or plural children data flows consisting of the form of the input data, the child function and the output data. A conversion logic is provided to convert a data flow to the corresponding flowchart or structured chart, or, as is the case of a data flow from skeleton and the processing logic to form a children flowchart or children structured chart, which is stored in the "method" as is the case of data flow.

BRIEF DESCRIPTION OF DRAWINGS

FIG. 25 shows an example of DDFT in the present invention.

BEST MODE FOR CARRYING OUT THE INVENTION

Figure 1:
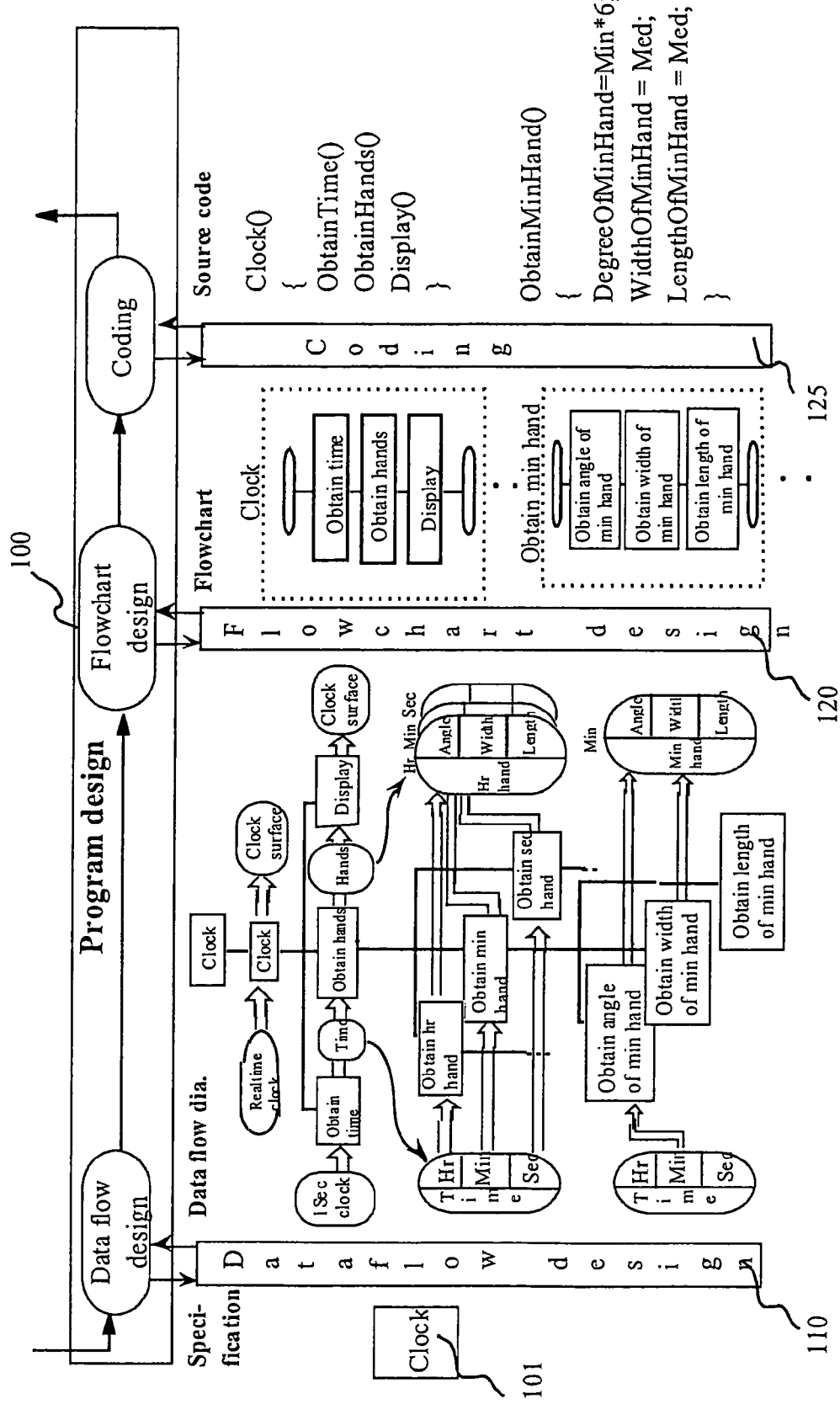
FIG. 1 explains the acquisition of design knowledge and the reproduction of human design, which shows the stepwise results of human design where the present invention stands.

Hereafter, the application of the present invention is explained with Fig.s.

First, the definition of design is explained.

Various ways of design as a human creative work have been published. In the present invention, design is regarded as one of human intentional activity from the wide viewpoint. For an industrial application, it is indispensable that the process is the most systematic, and the activities there must be measured and controlled. From this viewpoint, human concept, which is a result of human thinking, is taken as the essential key. From this viewpoint, a design process namely a human creative process, may be regarded as a hierarchically expanding chain of human concepts. By repeating hierarchical decompositions, the concept becomes clearer, more solid, and more detailed.

Therefore, the most original is the intended use and effect. Taking these as the final object and repeating them hierarchically, they are decomposed to their implementation and the detailed functions and their effects become clear. Today, industrial investments on the information systems have become a substantial percentage of each companies investment, and due to the largeness of such investment, it is well known that it is planned to unite several companies to rationalize the investment. On the contrary, however, it has not yet been received public attention that System Engineers who propose the system to be realized have reached to a level of top management's issue.

In such a high level, "Hierarchical object" in Military Science can explain the most effectively what the process should be. The top of an organization should decide 'the final object' to be attained from a strategic viewpoint. The person should decompose it hierarchically to several means to attain it, and assign each to the person's subordinates. For example, one of such final object frequently seen is to "increase the profit". For this purpose, there are several ways such as just to increase sales of the current product, introduction of a new product, decrease of the development cost or decrease of the inventory and so on. Suppose that the decrease of the inventory is taken. Realization means of it are as follows:

"Decrease of the amount of purchase and selection and use of standardized component parts as well as screening of vendors" assigned on purchasing dept., "Decrease of stock by discount sales" assigned on Sales dept., "Production order should be made on customer's order and decrease of stock" assigned on Production dept.

and so on.

This means that the parent concept "increase the profit" is decomposed hierarchically to its children concepts, "Decrease of the amount of purchase and selection and use of standardized component parts as well as screening of vendors", "Decrease of stock by discount sales", and "Production order should be made on customer's order and decrease of stock". This may be understood as the decomposition following "Hierarchical object system".

What a top management of a private organization expects is a system that indicates clearly what a top management should do, and for Systems Engineers such a management knowledge and business has been regarded as their indispensable knowledge. The situation is the same also in Production department. When people there discuss on "Decrease of inventory", it will results in "Listing of long staying items", "Total amount of stock", "Listing of stock amount, sorted by the length of stay and sorted by product code". It shows that the assignment is hierarchically decomposed, as the parent is decomposed to the children. The high level design in a system design is usually such detailing of user's object not detailing of software functions. They are known already as hierarchical object tree in Software Engineering. Now, such business processes are treated as "business process" which is also an important field of SE's. Present trend shows that the share of such SE's seems to be more than programmers who are engaged in actual programming. In the later section, it is also explained that programming is a hierarchical decomposition process. Prior to programming, there exists a hierarchical decomposition process for design, and the weight has been increasing.

Namely, the most original is the effect and use, which are intended primarily, and they are hierarchically decomposed successively to their means. In an upper stream, they are mainly services and external actions, and repeating hierarchical decompositions, they are reduced to elementary actions and external functions. They are further decomposed hierarchically to more detailed effects and functions. By further decomposing hierarchically, they are reduced to software functions (e.g. Software function is a conversion from the input to the output) and their structure. This successive hierarchical decomposition process is repeated until all functions reach to the level of actual design work.

Namely, each function detailed to a level fitted for a program design is hierarchically decomposed to a level where functions are software engineering functions. They, then receive further hierarchical decompositions. During these decompositions, each function becomes clearer, more solid and more detailed which are suitable to be converted to source code statements. Different from other ways of software designs, this way regards software design as a kind of "human intentional activity", where starting from the top management decision down to the final source code is treated in the uniform way.

An example is explained next. FIG. 1 is taken from FIG. 1 of a paper "Expert's Knowledge Structure explains software engineering" (Proceeding of Joint Conference on Knowledge-Based Software Engineering, JCKBSE '96 pp. 193-197, September 1997.) Fig.s show each phase of a design of a clock program. The left side is data flows, the center is a part of the corresponding flowcharts and the right side shows a part of source code.

Here, data is shown by a rectangle with a half circle on the top and the bottom sides, and a function is shown by a rectangle. A data flow diagram is a flow diagram starting from a data, repeating data then function, and ends at data. A flowchart is a flowchart connecting functions in the order of the execution.

In data flows in FIG. 1, the top function is a 'Clock', it is hierarchically decomposed to 'Obtain time', 'Obtain hands' and Display' to show what it is clearer. The second function 'Obtain hands' is hierarchically decomposed to 'Obtain hour hand', 'Obtain minute hand' and 'Obtain second hand'. The second function in them, 'Obtain minute hand' is further decomposed hierarchically to 'Obtain degree of minute hand', 'Obtain width of minute hand' and 'Obtain length of minute hand'. In the flowchart in the middle of the Fig., flowchart of 'Obtain minute hand' is shown at the bottom. As is seen, functions in the data flow correspond to those in the flow chart. Repeating hierarchical decompositions in a small step of design may easily attain such results.

Thus repeating hierarchical decompositions, when the last stage hierarchical decomposition becomes near to operations on data, the last stage hierarchical decomposition is replaced by the implementation means (In the case of software, a statement of computer language). By repeating hierarchical decompositions, the original intention, effects and uses, are converted to a group of the implementation means (computer programs in this case). Thus the aforementioned definitions of design may be applicable to not only software design but also human intentional activities in general. Thus the aforementioned definitions of design may be applicable to not only software design but also human intentional activities in general.

As has been explained, the bottom data flow group and the bottom flowchart, it is easily understood that 'angle' is expressed by 360 for one rotation while 'minute' is expressed by 60 for one rotation, 6 times minute becomes angle. Thus source code in the right side bottom of FIG. 1 shows that {(Angle of minute hand}={minute}×5). As is shown, by hierarchically accumulating such source codes, the entire program of a clock may be obtained.

The change from the original intention to the program is essentially the change from 'function level' to corresponding 'computer arithmetic operation level', and these have been explained by 'hierarchical implementation means'.

There are other ways of the expression. The last stage data flow or the flowchart denotes 'the value of degree of minute hand is 6 times of the value of minute', and the statement in charts is converted to source code. The reason that these are emphasized is that usual way of expressing all in program is not taken, but the present invention intends to capture all kind of human intentional activities through using natural language.

When describing a function, not only model statement like "Perform ΔΔ on ○○", but also "○○ is Δ and □" and "○○=Δ and □" are allowed, are used frequently for a simple function. For example, there is a natural language expression "area (S) of a square is the length (L)×height (H)". Another mathematical expression "S=L×H" or "S←L×H" may be used. In such a case, by replacing "=" by "It is S", the situation becomes the same. Therefore, explanations here are made all in natural language way such as "Perform ΔΔ".

The present invention puts emphasis on documents. During design, documents are left in a small step of design. Unitary design information is the input to a design, and the output of the design is the hierarchical unitary design information (group), which is hierarchically decomposed from the input. Namely, from the viewpoint of knowledge, the design output is the children concept while the input is the parent concept.

In software design, diagrams and charts are used together with natural language expressions. (Besides they play the roll as usual documents,) it makes people understand and memorize the relations, the organization and the structure well. The most popular are flow diagram (flowchart) and structured chart and data flow (diagram). Although they have been used already in simple explanations, they are explained in more detail below.

Figure 2:
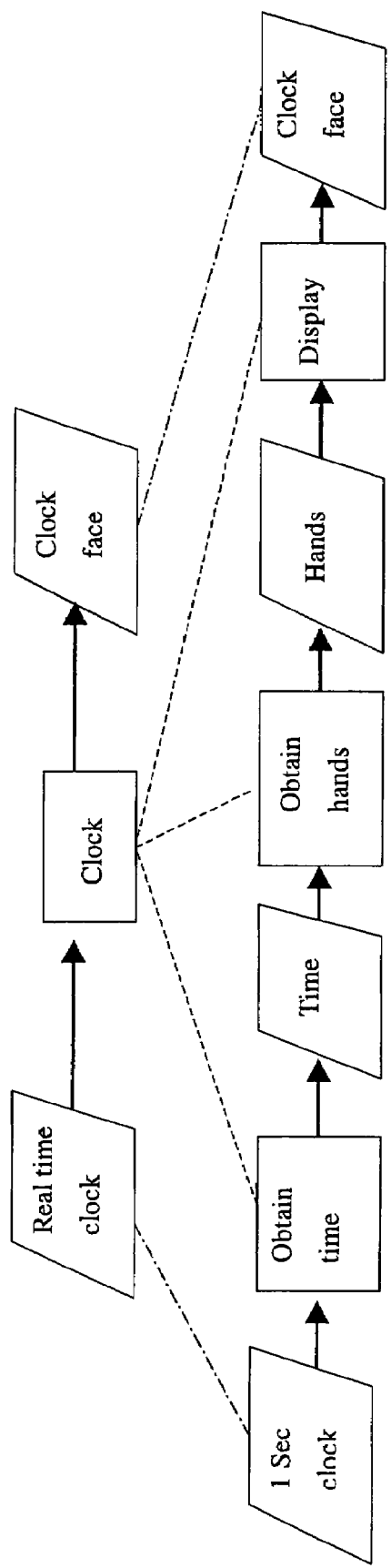
FIG. 2 shows a design rule as design knowledge in the present invention, namely, data flow diagrams to show the hierarchical decomposition from the parent concept to the children concept.

A data flow diagram like FIG. 2, symbols like (input side) data, function, data, - - - function, data (output side) are lined (usually in horizontally) and arrow lines connect symbols. Except for FIG. 1, following Japan Industrial Standard, data symbol is a rhomboid. A data flow expresses the implementation algorithm most lucidly. A description to define data or function is included in each symbol.

Figure 9:
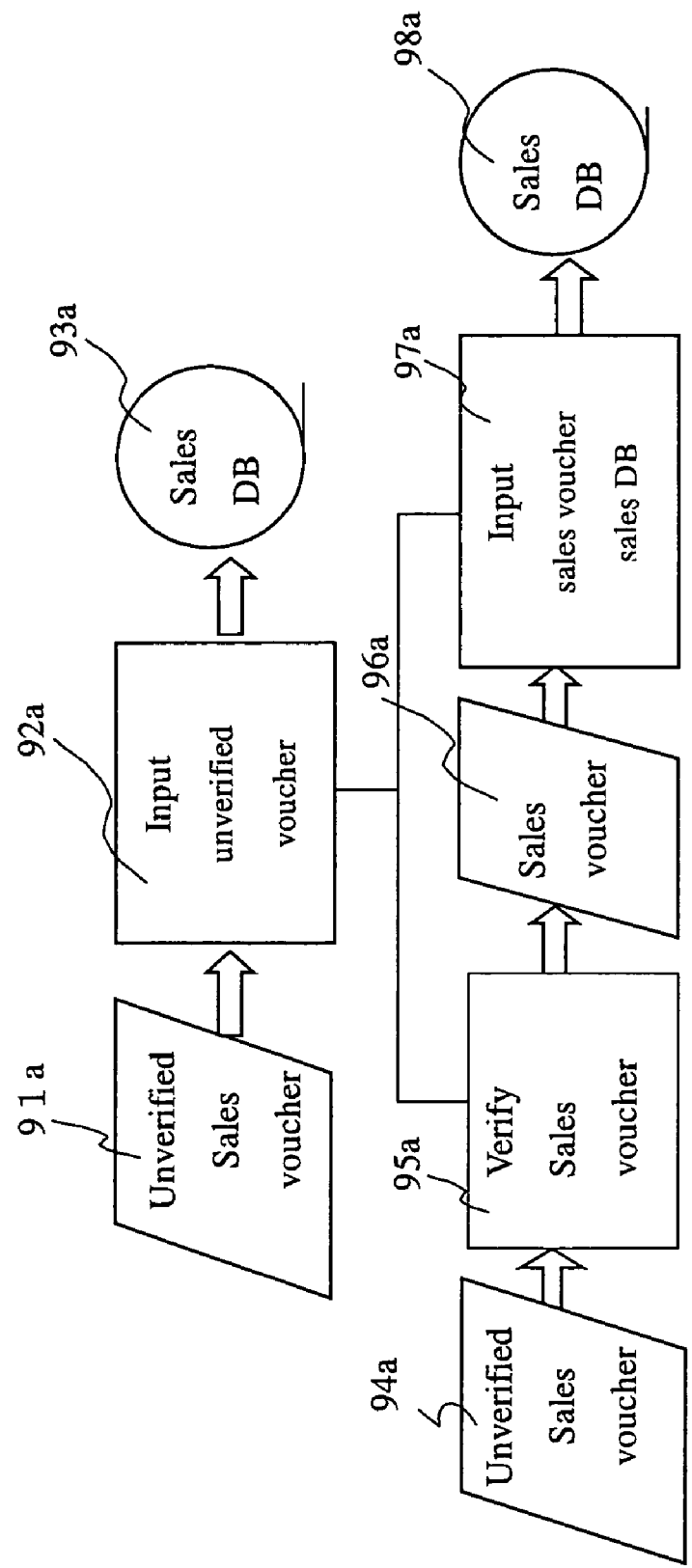
FIG. 9 shows a case of sale amount for explanation of skeleton.
Figure 10:
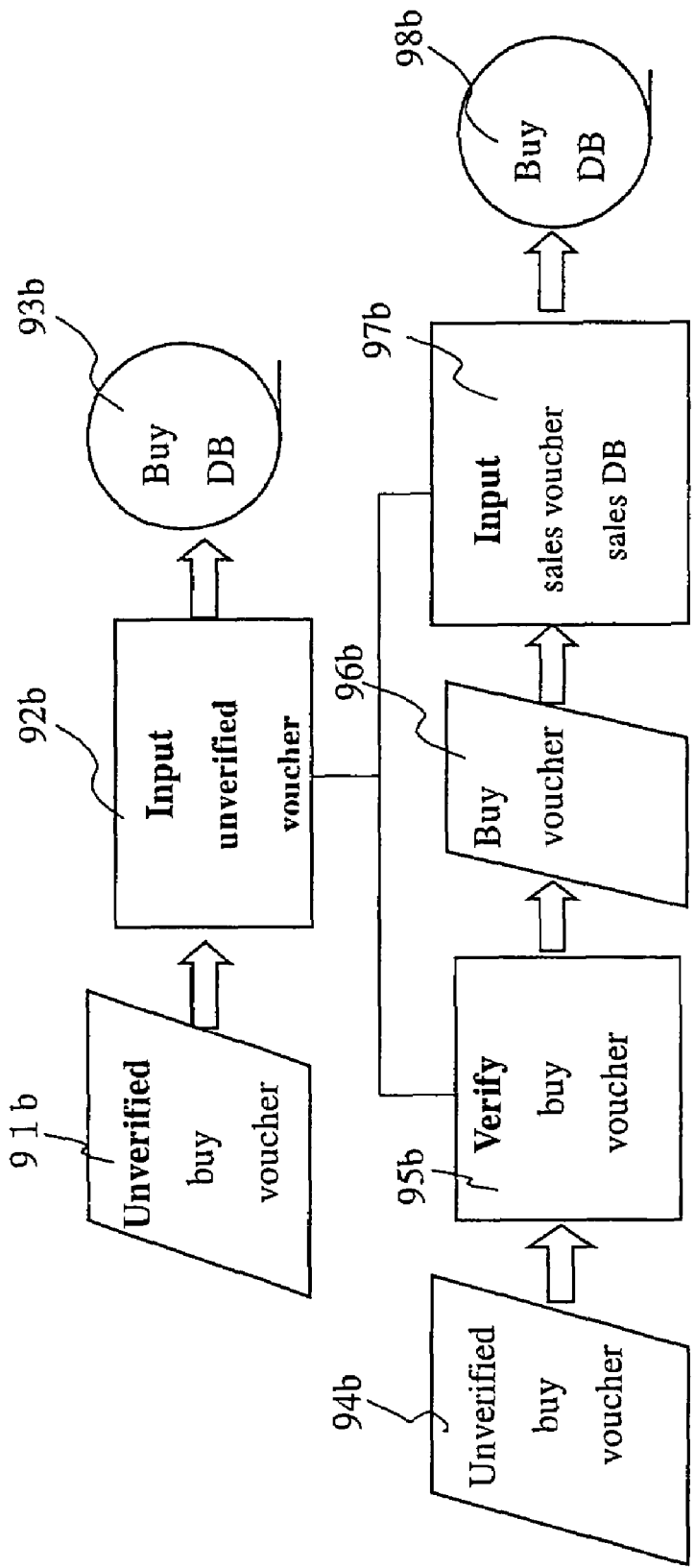
FIG. 10 shows a case of buy amount for explanation of skeleton.

In a flow chart, data is not written but only functions are lined from the start to the end in the order of the execution (usually vertically) and flow line connects with each other. In each symbols of flowchart, a description to define the function is written. Functions in a flowchart are the same as ones in the corresponding data flow. In a data flow, a function has the input side data and the output side data. Functions in flow chart (structured chart), however, do not have both the input and the output data; so to speak, a flowchart (structured chart) may be regarded as a kind of degenerated document. There are several ways to avoid this. One is to include the information to supplement data in the description of a function, as shown in FIGS. 9 and 10. The case not to show are FIGS. 23 and 24 where phrase in ( ) is omitted.

A flow chart shows not only the execution sequence but also branch and repetition of the execution. A data flow can show neither sequence nor branch and repetition, but it shows the implementation algorithm the most clearly.

From these, when a pair of the data flow and the flowchart is left during designing in a small step, the results show the implementation of function as well as their execution accurately.

A sample of general expression of the parent concept by data flow is shown in the second level of the left side of FIG. 1 as "Real time clock"→"Clock"→"Clock face", as line in the order of (Input) data→function→(output) data, here the data flow is the elementary data flow, which is the most universal. Strictly speaking, the output data is a state after the function has achieved, and the input data is the state prior the function effects. In this data flow, real time clock is given, and "Clock" works and as the result, clock face is updated to show the time. Therefore, the input side data is also the previous state and the output side data is the post-state, and this makes easier to think in the early upper phase design.) In this case, as the function to be performed is only one, and no flowcharts are needed. The data flow representing the children concept is shown in the third level data flow in the left side of FIG. 1 is shown:

"1Second clock", "Obtain time", "Time", "Obtain hands", "Hands", "Display", and "Clock face".

Data flow cannot show the execution sequence. Thus, the corresponding flowchart, "Clock" flowchart shown in the center of FIG. 1, shows the control sequence although they do not have data. The sequence starts from "Obtain time", next advances to "Obtain hands", and finally ends at "Display".

Then, design knowledge of each small step of design is expressed in the most perfect form by an elementary data flow for a parent concept and the children concepts consisting of a children data flow together with the corresponding flow chart (structured chart). In actual design, design is performed only using a data flow Fig. or a flowchart.

In design using only a data flow, a parent concept is the parent's elementary data flow, and the children concept is the children data flow(s), and FIG. 2 is one example. In design using only flowchart, a parent side concept is the parent's function and the children concept is the flowchart, which realizes this parent function. In the foregoing example, the parent function is a "clock", and the children flowchart is the flowchart, which is shown at the top of flowcharts shown in the center of FIG. 1. This is a flowchart, where functions in the children data flows shown in FIG. 2, are lined in the order of the execution.

Here, in order to show the most generalized case, design with data flow and a flowchart (structuring chart) is taken. But if the data flow of the kind that also denotes the control for the sequence, the use of one type diagram or chart is enough to do design. Even in this case, the present invention is also applicable.

The elementary design process knowledge used here is a pair of the parent concept and the children concepts. Hereafter this design knowledge for a hierarchical decomposition is named as a "design rule". This definition of the relation between human concepts as knowledge is different from common way of Artificial Intelligence. But it is indispensable for realizing a unified design system for software that can handle various human intentional activities in general in the high level as well as in the bottom programming level.

In the early phase of the system, which is near management, widened concept input and output data such as the previous state or information before the processing and the post-state or information after processing are taken. From the high level, where it is clearly human intentional activity, to programming level, the situation changes gradually.

If this hierarchically decomposing process is seen as human creative mental processing process, all may be treated in a uniform way. From these, it has been declared that design is a process for achieving the human intention. As a design is constituted from a chain of hierarchal decompositions as mentioned above, when the design trajectory is traced, it starts from the first parent, which is the most abstracted elementary design information, and goes to the children, which is a more detailed elementary design information group, and each of these children has its children (grandson as seen from the initial parent) in the similar way, and they constitute structural design documents.

In FIG. 1, "Clock" in the left side upper is decomposed to one stage lower in three ways, "Obtain time", "Obtain hands" and "Display", and each of them further hierarchically decomposed downward. For example, "Obtain hands" is decomposed hierarchically downward in three ways, "Obtain hour hand", "Obtain minute hand" and "Obtain second hand", and each of thus decomposed is hierarchically decomposed to downward. This has been mentioned earlier that the design is a chain of hierarchical decompositions. If these chain-like operations are reproduced, the design may be automated.

Hereafter the macroscopic operation of the mechanization method of human design operations by standardizing them is explained referring to FIG. 1.

The given specification is Clock, and the first data flow has only one function "Clock". In order to make this into a regular form, it is added the input data "Real time clock" and the output data "Clock face" to form an elementary data flow as shown in the second level. Using design knowledge, it is hierarchically decomposed to third level data flows. Taking FIG. 1 as design documents, recording the progress of the design, design operations here are as follows: The parent elementary data flow consisting of "Real time clock", "Clock", and the "Clock face" is given to the engine, which is provided for the intellectual operation. The engine details the parent using the design rule for this, shown in FIG. 2, namely it pastes children concepts in the design rule, consisting of "1-second clock", "Obtain time", "Time", "Obtain hands", "Hands", and "Display", and "Clock face" under the parent concept elementary data flow to form the third level data flow.

As the design rule accompanies also the flowchart "Obtain time", "Obtain hands" and "Display" as the children concept, it is also recorded on the design document. It is the top-level flowchart shown in the center of FIG. 1.

In 2nd level data flow in FIG. 1, there are no parent concepts left. Then, the control goes down to the third level data flow. It sends the elementary data flow of the first function "Obtain hands", consisting of "1 second clock", "Obtain time" and "Time", to the engine. On acquiring necessary design rules, it pastes children data flows in the 4th level (These are not shown in FIG. 2). Next, the control moves on the 2nd function "Obtain hands", and it sends out the parent elementary data flow to the engine and receives corresponding design rules. Since the input data "time" of the parent elementary data flow is common to the 1st function, thus the output data of the 1st children's and the input data of the 2nd children's function is common. The output data pasted as a child of 1st function is commonly used as the input data of the 2nd function, and following operations are performed as to paste the function and the output data of the children. The same processing is performed also on the following 3rd function "Display", and there are no parent functions to be processed anymore. The control goes down to the 4th level, and processing is performed on the children of "Obtain hands", namely "Obtain hour hand", "Obtain minute hand" and "Obtain second hand".

There is a design of flowcharts in parallel to these. Children concepts are generated from the engine, and they are pasted successively in the flowchart area. As has been explained, when there are no branches or repetitions, a flowchart consists of the sequence of functions in the children concepts' data flow. Thus in the case where the sequence of functions in the flowchart and the order of the appearance in the data flow are the same, the engine can get the children flowchart from the data flow by simple conversion. But, in case where a branch or a repetition exists, it does not conform to the data flow, and thus the generation of a data flow is not made staying at the same step.

In order to do these operations, a starting point mark is provided, which specifies the elementary design operation made on that function. The design is performed in two operations, where the first is the unitary operation about the function as the parent concept, and by advancing this starting point mark to the right in a step by step manner until the end, then goes downward one level and repeats to advance to the right. Starting point marks on the data flow and the flowchart advance synchronously performing each unitary operation.

Next, the elementary design knowledge in the process namely the design rule is explained. FIG. 2 is a part of data flows shown in 2nd and 3rd level in FIG. 1. The parent concept is shown as an elementary data flow in the upper, while the children concepts are shown by the lower data flow. A design rule for a data flow design is like one shown in FIG. 2, but the design rule for a total design accompanies the flowchart as the children concept.

A design rule for flowchart design consists of the function in the parent concept with a flowchart of its children concepts. A corresponding design rule for only flowchart consists of a pair of the function in the parent concept and the flowchart as the children concept. They may be obtained by rotating data flows in the most left side of Fig. by 90 degrees counterclockwise and deleting all the data. In a flow chart design, the parent function is shown in the preceding page while the children flowchart is shown in the following page. One example is that the first page shows only a function "Clock", and the second page shows the program sequence of "Obtain time", "Obtain hands" and "Display". Thus, a hierarchical relationship is shown in two different pages resulting in difficulty of both recognition and understanding. From a practical viewpoint, not flowchart but structured is used.

A structured chart uses three types of elementary graphic symbols of "concatenation", "branch" and "repetition", and using each symbol, the program structure is written in a structured chart graphically.

Figure 3:
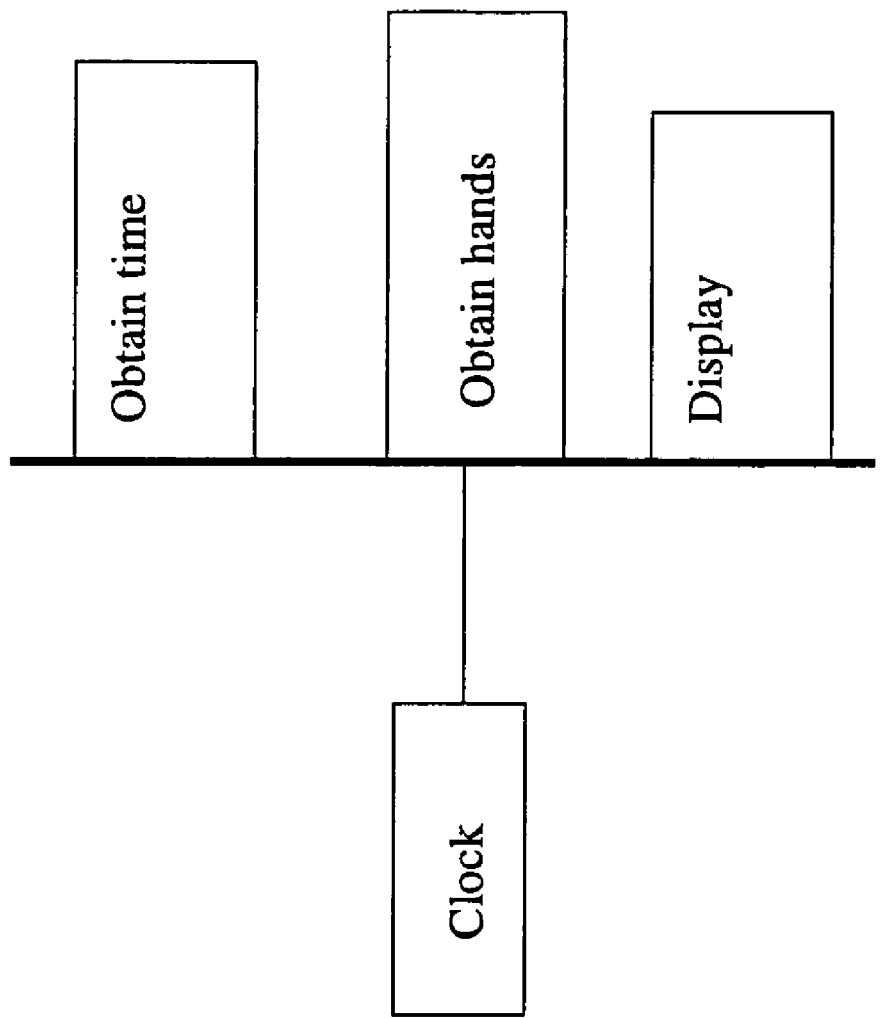
FIG. 3 is a structured chart (flow chart) used in the present invention.

FIG. 3 shows the same hierarchical relations by a structured chart PAD (Problem Analysis Diagram). In PAD, a parent concept shows its children concepts, by extending a line to the right side of the symbol, providing a vertical flow line along which each children concept is lined in the sequence from the top to the bottom, and the vertical line is connected to the line extended to the right of the parent concept. Although not shown in a Fig., in a case of repetition, the first function (box) shows the condition to repeat the function and extends a line toward right to reach the second function (box) where the function to be performed repetitively on the condition. A vertical line is written in the 1st function (box) to show repetition. Although not shown in a Fig., a square box with a wedge in the right side is the graphical symbol for a decision, and the branch condition is shown in that box. By extending a line along the upper side of the wedged box, the processing to be performed in case the condition is true, while extending another line along the lower side of the wedged box and processing to be performed in case of the condition is false is provided.

FIG. 3 shows a design rule corresponding to FIG. 2, as expressed by structured chart. The left side function shows the parent function, the side vertical line and boxes along it show the flow of the children concepts. As shown in FIG. 3, the pair of the parent and the child(ren) are shown side by side in the same sheet of the diagram, and each of the children concept, and as it may be repeated that when it becomes a parent concept, it may extend to the right to add own children, and thus a number of the parent and the children relationships may be shown in the same sheet of the chart. When a structured chart is used, the chart shows functions as the parent and the children groups may be written in the same chart, and the t hierarchical relations are shown as a tree growing toward the right, and thus the hierarchical decomposing relations becomes the most easy to see.

There is DeMarco's data flow diagram, which is different from those used here. It takes a simplified form, which is simplified for business data processing by eliminating data symbols in order to make the diagram simple, but data names are written along lines thus hiding data structure, the detail of which is defined in data dictionary. Technologies described here are the basic principle and may be extended to use this by providing processing for the data dictionary part.

Beside these, there are various data flow diagrams developed for respective data flow languages. Although there are various proposals, but they have not yet been standardized. Their key point is to add some control function (like flowchart) on respective data flow diagram. The technologies described here, may be readily applicable to data flow related area, and for the control, those related to flowchart are modified to be included in the said data flow.

Next, the outline of the automatic acquisition method of design knowledge or design rule from existing design documents is explained.

Japanese Patent Laid-open No. Hei 10-320188 publishes the most fundamental method of acquisition of design from structured chart. The method has been extended to apply to also data flow. Hereafter, the outline of the operation of the expanded method is explained.

The overall operation of the automatic acquisition is explained using data flows in the left of FIG. 1. As has been described on the automatic design operation in a formulized way, it is divided into the overall operation of a design document, and the local operation to acquire the design rule concretely on the parent in concern. Set a starting point mark on the parent function of a design rule, the overall operation is performed by advancing this starting point mark. At this time, the local operation is performed while the starting point mark stays on the parent. For simplicity, the overall operation is explained in a case when it starts from the specified point to go downward in a single stroke way.

The starting point mark is set on the function "Clock" in the center of the data flow of the 2nd level, which is the top level data flow in the left side of FIG. 1.

When it starts, the local operation to acquire the design rule automatically begins. First, it walks around the data flow, as "Real time clock", "Clock" and "Clock surface", to acquire information on the parent concept. Then, it walks around the third level data flow, "1 second clock", "Obtain time", "Time", "Obtain hands", "Hands", "Display" and "Clock surface", to acquire information on the children concept.

Then the local operation terminates to resume the overall operation. As there are no functions in the 2nd level anymore, it goes down to the 3rd level, and the starting point mark is advanced to the most left side function "Obtain time", and the local operation starts. After this finishes, the starting point mark advances to the next function, "Obtain hands", and local operation is performed. After this finishes, the starting point mark advances to the next function, "Display", and the local operation starts. After this finishes, as there are no functions left in this level anymore, it goes to 4th level. Hereafter, the overall operation operates in this way.

Namely, when all parents in a level are processed, it goes down to one level lower, and processes children like, 1st parent's 1st child, the 2nd child, . . . , 2nd parent's first child, the 2nd child . . . , thus advancing the starting point mark local operations are performed. The situation is the same as the automatic acquisition and automatic design.

In order to attain this, a tree walk program is provided to advance the starting point on all the function. In FIG. 3, it starts from the initial parent concept symbol "Clock", then goes to its children side function symbol "Obtain time", "Obtain hands" and "Display", and goes back to "Clock". The same tree walk starts from the first children concept "Obtain time" and does the same.

Among the local operations, the acquisition of a parent concept is performed in following way: It starts from a parent function bearing the start pointing mark (e.g. "Clock" in FIG. 2), and acquire all the description in the symbol. Next, it advances by one step to the left to its input side data ("Real time clock" in the left side upper of FIG. 2). It acquires descriptions in the data (group). Then, it goes back to the parent function with the starting mark and advances by one step to the right the output side data ("Clock face in the upper right side of FIG. 2), and acquires descriptions in the data (group). These acquired descriptions are process to obtain the parent concept information as the elementary data flow.

In order to move from a parent to its children, the relation between them has been provided. For example, each function in a children concept data flow(s) has a hierarchy line to the function in the parent concept. The starting data of each children data flow has a relation line (dot and line) to the input side data of the elementary data flow of the parent concept. Similarly, the tail end data of each children data flow has a relation line (dot and line) to the output side data of the elementary data flow of the parent concept.

After tracing a parent or the elementary data flow, it goes down to a children data flow using the relation line, it traces the children data flow and during tracing, it acquire the description of each symbol constituting the data flow. The children concept may be reconstructed by processing these descriptions. Following is one example method. Namely, it starts from the function "Clock" with the starting point mark, goes to the left to reach the input side data "Real time clock", and goes down one level to the starting data "1 second clock" of the children data flow. Besides this, it goes to the right to reach the output side data "Clock face", and goes down one level to the tail end data "Clock face" of the children data flow. Starting from both input side starting data and output side tail end data alternatively, the left side tracing advances to the right while the right side tracing does to the left alternatively. During thus doing, when both tracing collides, they stop. During tracing each symbol, they acquire descriptions from each symbol. When all these are processed, the children data flow may be reconstructed.

Next to the explanation on the case of the data flow, following is that on the case of the structured chart, and the local operation is explained in short. FIG. 3 shows a PAD structured chart corresponding to the data flow shown in FIG. 2. The parent concept may be obtained by acquiring the description from the leftmost function symbol "Clock" bearing the starting point mark, and the parent concept may be restored by acquired description. Children concepts are right side of the vertical line in the center of the FIG. 3. A tree walk is made starting from the parent symbol. Namely, it starts and goes upside right side and then goes around the 1st children function, "Obtain time" to acquire its description in the symbol, and goes down along the vertical line to reach "Obtain hands" and do the same acquisition as before, and goes down to reach "Display" and does the same. Thus going down along the right side of the vertical line, and in the bottom, it turns upward and goes up along the left side of the vertical line, and stops the local operation when it returns the parent function "Clock".

These operations are made on both data flow and structured chart synchronously. By these operations, it becomes possible to confirm the coincidence of two documents and acquisitions of all the design knowledge from document(s) at once. It is also possible to acquire only parents' concept.

The automatic design by standardizing human design has been explained before. The more detailed explanation of automatic design of data flow, using the aforementioned explanation, is given here. As is the case of automatic acquisition of design knowledge, the entire operation is divided to the overall operation and the local operation by pasting design knowledge. By setting the starting point mark on the parent function in the parent data flow under design, the overall operation and the local operation are integrated functionally.

Therefore, in the case of automatic design, the local operation, where the difference becomes clear, as well as the sequence of overall operation are explained.

As an example, data flows in the left side of FIG. 1, and the automatic design on the function "Clock" in the 2nd level to develop the 3rd level data flows is chosen for the explanation.

Figure 4:
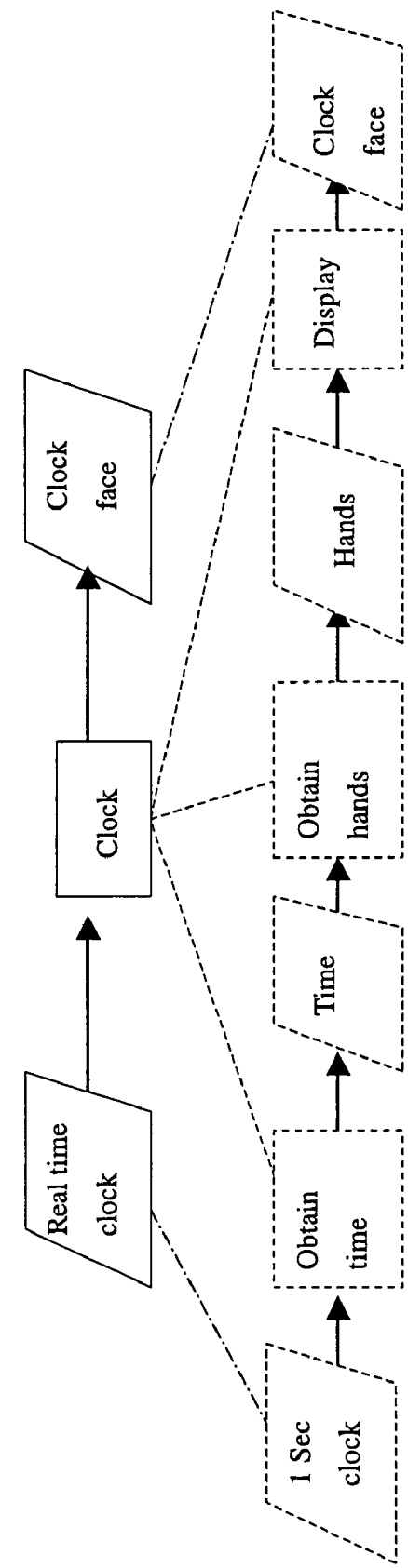
FIG. 4 shows the parent data flow and the children data flow, connected together, both relate the present invention.

FIG. 4 shows the elementary data flow of the parent before design, and Figs by fine dotted line show after the children data flow is pasted. The starting point mark is set on the parent function "Clock" in the diagram. When automatic design is commanded, the local operation first traces the elementary parent concept data flow to acquire the parent concept.

The thus gained parent concept is sent to the engine, and the engine responds the design rule for the parent concept. (There are two kinds of engines, one is knowledge base and another creates a design rule automatically they will be described later on.) FIG. 2 shows the design rule to be used in this case. Automatic design on this parent concept in this case is, to prepare the children data flow, or the lower part data flow of the design rule shown in FIG. 2, and paste it under the parent's elementary data flow.

There are several ways of pasting, and the simplest example is explained here. In the parent data flow in FIG. 4, it starts from the starting-point-marked-parent function, and goes to the left and reach to the input data "Real time clock", while in the design rule side, it starts from the parent function of the design rule and advances to the left reaching to the input side data "Real time clock".

Next is pasting. For simplicity, the case of one-way progress is explained. First, in the design rule side in FIG. 2, a downward connection from the input side data "Real time clock" is sought, and if it exists, the down ward connection is copied to the input data "Real time clock" in FIG. 4. Then in the design rule side, it goes down along that downward connection, reads out the input data "1 Sec clock", while in the design work side, using that downward connection, it reads out that downward connection, and connect its another edge to the data "1 Sec clock", and record the data "1 Sec clock" itself. Next, in the design rule side, the right side output connection of the input data "1 Sec clock" is sought, and prepares the right side output connection. Thus repeating, when the output side data of the children data flow is connected to the output data of the parent, copying of symbols are terminated, various connections between the parent and the children are established, and thus the local operation finishes to advance the starting point mark to the next function.

These processes are learnt from expert designers in high maturity organization for software developments, and they simulate the model. Such experts manages accurate, clear and precision natural language ability, and capable of detailing concepts hierarchically in small step of design. In such a design, the average expansion rate of the hierarchical decomposition is a little smaller than 3. For example, in FIG. 1, all the expansion of functions and data are 3. When thus decomposed, the decomposition is simple and irregularities of data flows do not arise. The present invention stands upon such a basis.

Turning topic in the field of Ergonomics, there is 'Law of least efforts' found by Zipf. It says that, "When a person faces a problem, the person tries to solve it in the simplest way first. If not successful, the person tries another more advanced way. If not successful, until the problem is sold, the person repeats to grade up a more difficult way to solve it". In the field of Artificial Intelligence, Rusmussen classified human knowledge to "Skill level", "Rule level" and "knowledge level". This points out the same but from another viewpoint.

In human design, the simplest solution of the engine to create a design rule is called "Skill level", and it is a kind of simple reuse of what experienced before. Japanese Patent Laid-open No. Hei 10-32188 is an example of this. It acquires the aforementioned design knowledge automatically and stores them in knowledge base, and it sends back the aforementioned design knowledge or design rule, and performs the aforementioned automatic design. There are many variations in the more advanced way. The simplest automatic creation is a system, when a parent concept is given; it refers to the more basic design knowledge and creates a design rule as the design knowledge. In this explanation, all such mechanism is abstracted and called as engine, and various combinations of engines are possible.

These engines have mutual relationships. Namely, when a person could solve a problem using a lot of time, the person solves a similar kind of problems in shorter time based on the past experiences. Design rule is one of such experiences. Once the creation is experienced and memories it, during solving similar problems the past experienced design rules are reused to create a new design rules. This enables the increase of the efficiency. A person remembers after several time experiences, while a machine can remember at the first experience. For example, if thus created design rules are accumulated in a knowledge base, it may be easily achieved. In such an engine system, it is important that various engine units work together collaborating with each other, and these enable the speed up of the system.

A parent concept has generally several children concepts. One can realize this, when the person refers to a dictionary. Due to the nature, in the reuse system published in Japan Patent Laid-open No. Hei 10-320188, after the parent concept is sent to knowledge base and when plural children concepts are found, a human designer selects and specifies a suitable one from them. Also an automatic creation system cannot create automatically otherwise knowing which children concept should be taken. Hereafter, this problem will be explained, first the structure of human design, and next the principle for the solution.

As has been already explained, design of software starts from the final effect and use, which should finally be realized. Starting from the final effect, it is hierarchical decomposed to its realization mean(s), and during the process, the concept becomes more solid. Taking one of thus decomposed and clarified realization mean, this time taking it an object, it is further decomposed hierarchically to several mean(s). Thus repeating, the resultant object or mean becomes clearer, more solid and more detailed. As these objects forms a hierarchy, they are called an object tree.

As this realization advances, an object thus decomposed shows not only the object-like color but also it shows some color related to external function. Although these processes are performed in a stepwise manner, but the object at the starting point and functions gained after decompositions belong to different concept levels. Now, let's suppose there is a function plain under the object plain. The object tree in the object plain grows its branches hierarchically, and some branches have links to lower level functions in the function plain. As the object tree grows its branches, and at the same time, it is gradually shifts in the function plain.

Once an external effect and the external function are determined, the input needed to the function is also defined. When both output and input are defined, the algorithm for converting the input to the output is also defined. During repeating hierarchical decompositions, such a realization also progresses, and external functions changes internal functions gradually. (In Software Engineering way, a conversion process from the input to the output is called function.).

Namely, each outline of the output data, the input data then the algorithm are decided, the framework of the external function becomes clear, and the function is hierarchically decomposed, and functions grow like a tree. At the same time, the output and then input are decomposed hierarchically to show tree like structure. These structures of function and data have been already explained. As is shown, function and data are in dual relationship, and they are explained in textbooks as "data structure and algorithm".

As has been mentioned, there are the upper object plain and the lower function plain where both functions as well as data are hierarchically decomposed to form respective hierarchical trees. A part of upper level object trees effects lower data and function hierarchical trees, and it reflects on the way of the design.

As a result, the output data, the output data with the input data or in addition to these a part of the object tree shows the way of the design correctly. From the output data, the output data with the input data or in addition to surrounding functions and data, the way of the design may be known considerably correctly estimate the way of the design and the automatic selection of design becomes possible. Based on these, function to select the way of the design among candidates is named DDF (Design Direction Finder).

Generally, a person repeats hierarchical decomposition of the object aiming at an intention, and the key point is summarized to be "5W 1H", where 5W come from each initial of what, where, who, when, why and how. For a complicated human activity, it is necessary to use delicate identifications and direction resulting in a complex sentences. When using 5W1H precisely states them, they can specify with almost no ambiguity.

When a small step of hierarchical decompositions is made, (even if it requires 5W1H at a maximum in the usual way), each statement requires only a part of them. In a programming area, no such a difficult requirement exists, and a few set of 5W1H is enough. (In case it is necessary to express 5W1H in detail, it will be expressed at plural decompositions). Actually, if you refer to a dictionary, you will find only several meanings irrespectively of verb or noun. From these, when actual cases with data are analyzed from a viewpoint of object, the necessary words fitted for the situation may be determined.

Hereafter, they are explained on an example. As an example from business programs, an inventory control program is taken. In it, as a verb "input" has plural meanings, some cases are explained with data flow.

Figure 22:
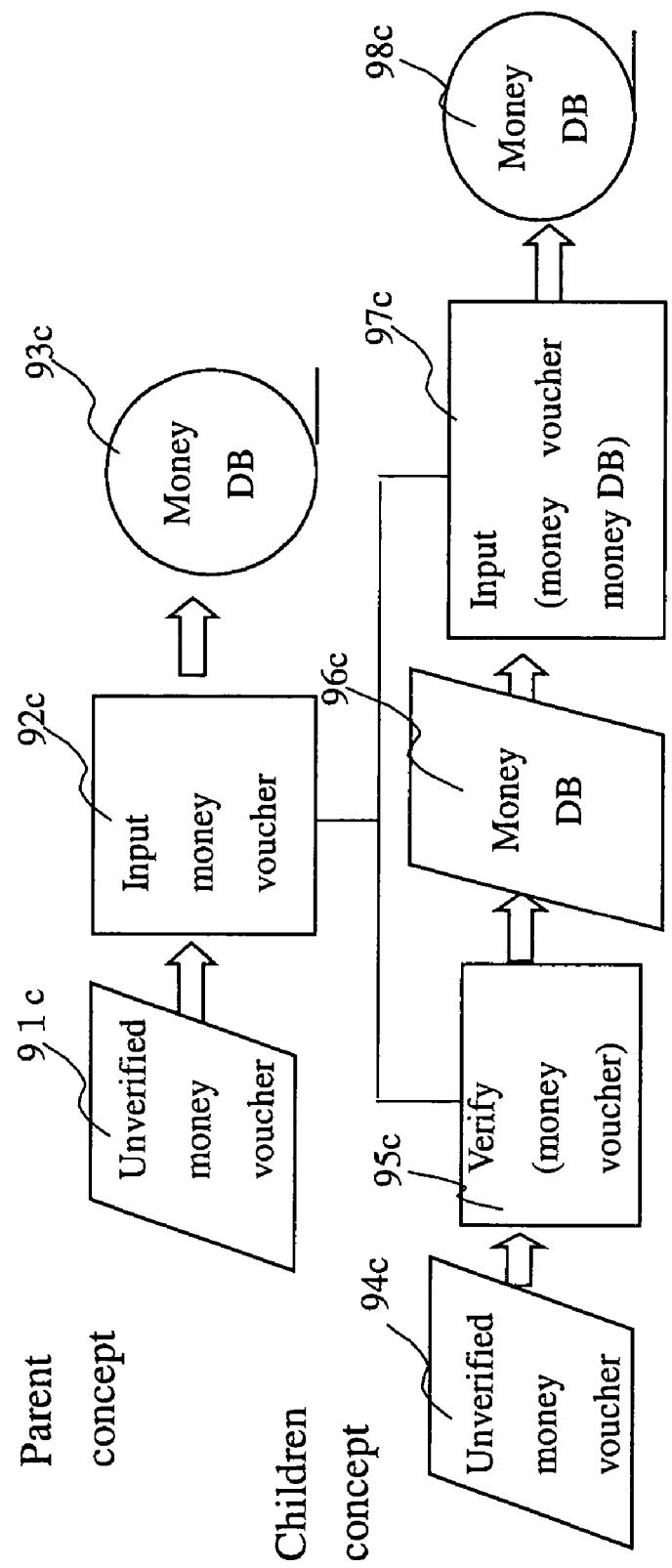
FIG. 22 shows a sample design rule when the verification of the input is needed.

The first meaning is the case where input must be verified prior to processing. FIG. 22 shows an example design rule. (In this example, phrases needed for the strict detailing to follow the pattern of "Perform ΔΔ for (object) ○○ have been shown in parenthesis.) If input data from the outside is not yet verified, it must be verified prior to any processing. The parent concept in this example consist of the input data of 91c 'Unverified xxxx', the function 92c 'Input', and the output data 93c 'yyyy'. As the prefix of the input data 91c shows 'Unverified', the validity of the input data must be checked and verified prior to the processing. In order to do it, the children concept in this case consists of the input data 94c 'Unverified xxxx', 1st function 95c 'Verify', the middle data 96c 'xxxx' which is derived by deleting the prefix 'Unverified' from the original, 2nd function 97c 'Input' and the last output data 98c 'x DB' (e.g. Incoming money DB).

Figure 23:
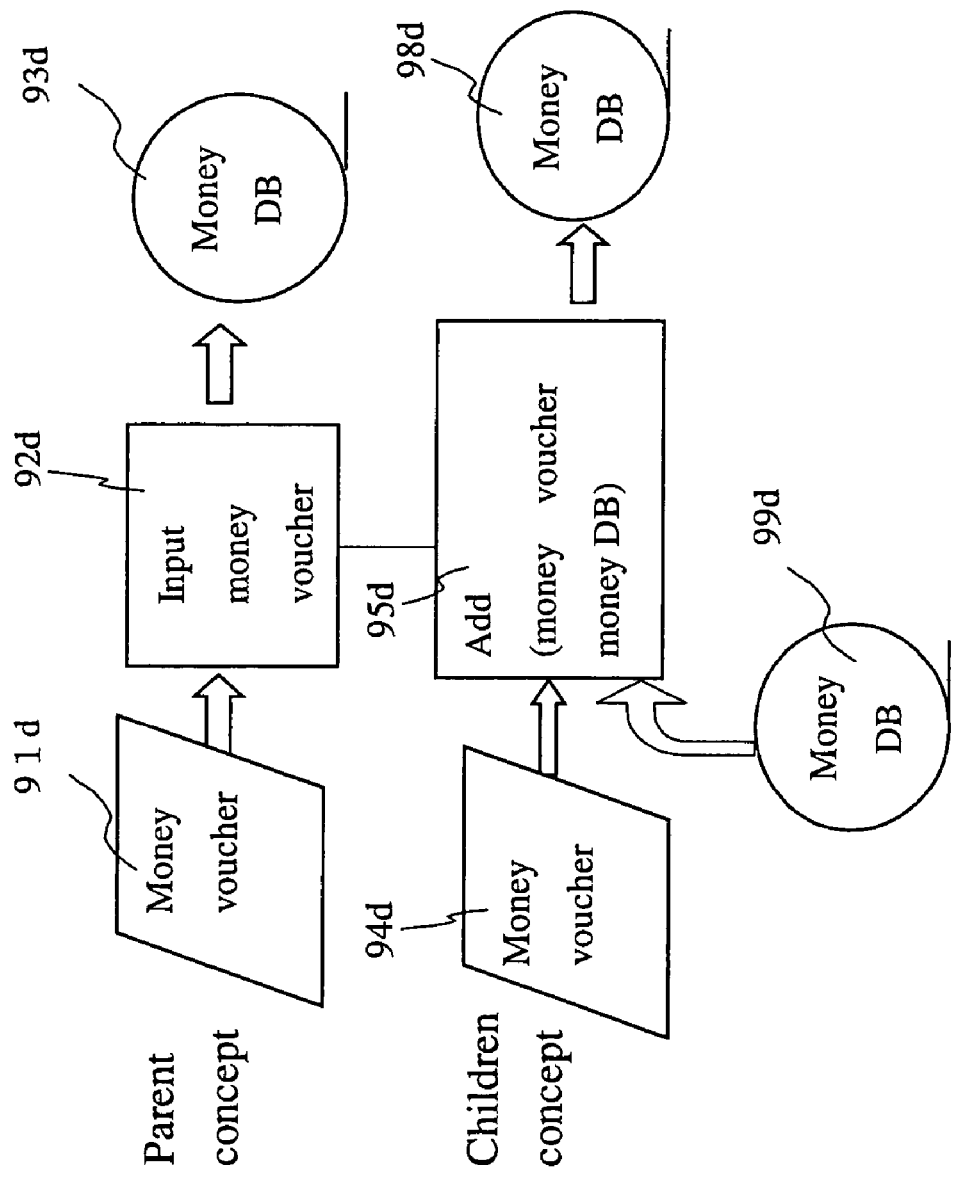
FIG. 23 shows a design rule where addition is needed.

The second meaning of the word 'Input' is the case to add input. FIG. 23 shows the design rule in this case. (In this example, phrases needed for the strict detailing to follow the pattern of "Perform ΔΔ for (object) ○○" have been shown in parenthesis.) The parent concept, in this example, consists of the input data of 91d 'Money voucher', the function 92d 'Input' and the output data of 93d 'Money DB'. In this case, a new money voucher is added to accumulate on Money DB. The child concept, in this case, starts from the input data 94d 'Money voucher', and it accompanies reference input 99d 'Money DB'. The function 95d 'Add', and the output data 98d 'Money DB'.

Figure 24:
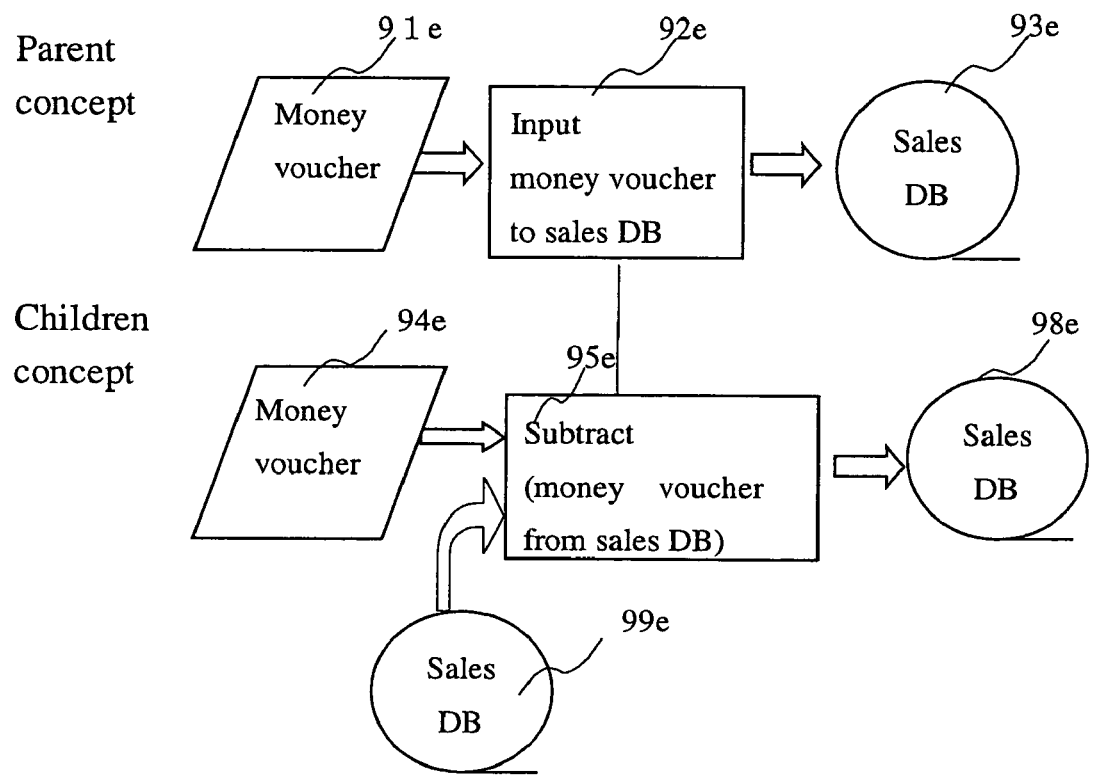
FIG. 24 shows a design rule where subtraction is needed.

The third meaning of the word 'Input' is the case to subtract input. FIG. 24 shows the design rule in this case. (In this example, the part following the rule "Perform ΔΔ for (object) ○○" is shown in parenthesis.) The parent concept in this example consist of the input data of 91e, the same as before, 'Money voucher', the function 92e 'Input', but the output data 93e 'Sales DB'. In this case, a new incoming money voucher is to decrease by the amount of the money voucher from Sales DB.

The child concept in this case starts from the input data 94e 'Money voucher', and it accompanies reference input 99e 'Sales DB'. In the case of the function 95e, it is 'Subtract', and the output data is 98e 'Sales DB'.

Parent concepts of these three examples, in the narrow meaning of the word, are all 'Input'.

While, their children concepts are in the case 1: the first function 95c 'Verify' and the second function 'Input', in the case 2: the function 95d 'Add', and finally in the case 3: the function 95e 'Subtract'.

Hierarchical expansions in small step of design are usually simple as shown by these examples.

In an automatic design system, like one published by Japan Patent Laid-open Hei 10-320188, where structured chart is used, the system refers knowledge base in order to get design knowledge. On receiving plural design knowledge from it, a human designer selects the most suitable one out of them.

In the present invention, actual use cases were analyzed. Based on the result, it is automated. They are as listed below.

The first meaning is known by the prefix 'Unverified' of the input data 91c constituting the parent concept, the second meaning is known by the input data 91d 'Money voucher' in combination with the output data 93d 'Money DB' both constituting the parent concept, and the third meaning is known by the input data 91e 'Money voucher' in combination with the output data 93e 'Sales DB' both constituting the parent concept. Basically, the selection is performed referring DDFT (Design Direction Finder Table) 196, which shows the conditions for the identification as well as the first, second, and third meanings.

From these examples, it is understood that the way of design may be determined by the input data 91 and the output data 93. Practically, the input data 91 and the output data 93 are enough for the decision, and in some special cases further preceding inputs or outputs are needed.

From the previous discussions, it is possible to design the automatic decision mechanism of the way of design for the automatic design system, where the children concept is automatically generated from the parent concept. As it necessitates the input and the output of the parent concept, it is very difficult to add such function in a system using only flowchart. In a system using data flow and structured chart or a system, where these two documents are amalgamated to one kind of chart or diagram intended for data flow language oriented system, it is easy.

Next, system's aspects of the present invention are discussed. As such automatic design system has some cases where the automatic operations are not made, it is indispensable that a designer can intervene the operation for correcting the results of the automatic design. Even if the system cannot complete design, as designs must be completed before the deadline, the system must support human designers even where the system cannot design automatically. CASE (Computer Aided Software Engineering) tools are suitable system for such use.

Next, combined use of both data flow and structured chart are necessary. In usual way of design, structured design using data flow is made in the earlier phase or higher level design, while structured design is made using structured program design using structures chart in the lower level or the down stream of design. It is not reasonable from a practical viewpoint to provide both data flow CASE tool and structured CASE tool, as they require more man-hours.

As has been mentioned earlier, in the design method leaving design documents in a small step of design, except for cases of branch and repetition, functions are lined in a data flow chart the same as the sequence in a flowchart (or structured chart) in general. Thus it becomes possible to convert from another side. Provided that, in case such design results are not good, the human designer can correct the automatic designed sequence, it becomes possible to generate flowcharts or structured charts from data flow. Usually, design is made using data flows and structured charts follow. Only in the cases of branch or repetition, the first design is made using structured chart, and data flow follows synchronously. In this way, only one chart or diagram is used essentially, and thus it is efficient. But this is true only in the case of design in a small step.

In such human works, as it is inevitable that design are not free from errors, it is necessary to provide to check both side's designs not to disagree and to guard such possible errors. From these reasons, the system not only equipped with CASE tool functions for several documents but also it is an integrated system.

The automatic design method that generates design knowledge, named design rule, becomes possible to be provided by deciding the way of design automatically and supplementing the detail by various environments.

Following describes the outline.

In FIGS. 9, 10, 22, 23 and 24, the various aspects of a verb 'Input' have been explained. In them, a typical way of the function description 'Perform ΔΔ (object) ○○' has been taken at some redundancy of the information in data flow.

Figure 11:
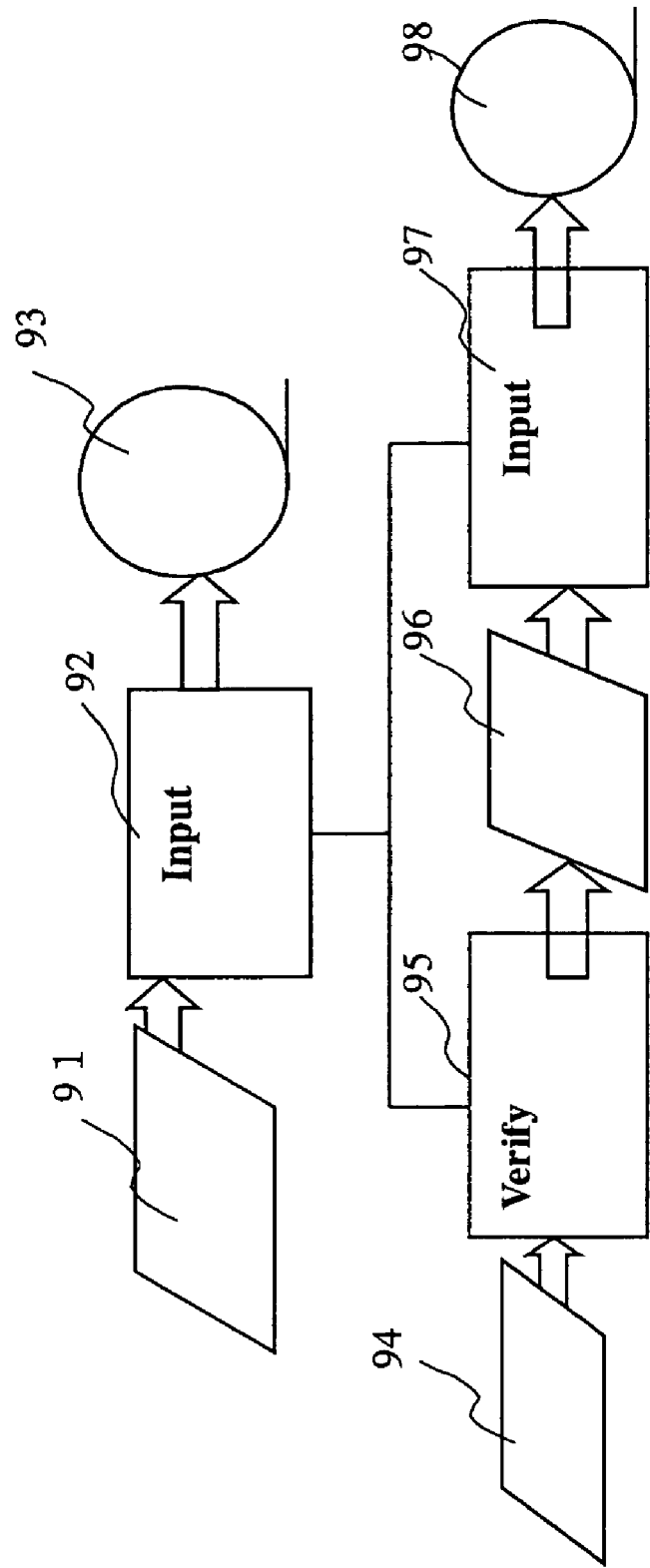
FIG. 11 shows a common skeleton as abstracted form of the present invention.

Looking FIGS. 22, 23, 24 and 9 and 10, it is closes up that a common part or the skeleton of these instances. FIG. 11 shows it.

Conversely, if seen based on the skeleton, actual instances are modifications on this skeleton. Especially, names of the input data 91 as well as the output data 93 are included in instances according to some rules. These tell us the modification processes follow essentially a few pattern of processing. It becomes possible to generate design knowledge named design rule and it is described hereafter.

The description is made on an automatic design system, that generates the children concept automatically, where the parent concept is the elementary data flow as the input, while data flow, which is hierarchically decomposed from the parent data flow, as well as a structured chart, which shows the execution sequences of functions matching with data flow, are the children concept.

The input to the automatic design system is the parent concept or the parent' elementary data flow, and the output is the children concept data flow and the structured to show the control.

In order to generate design rule, which is design knowledge to show a hierarchical relationship, more basic design knowledge is used. The central structure is Design Direction Finder using DDFT 196 and the Verb dictionary 130.

Figure 13:
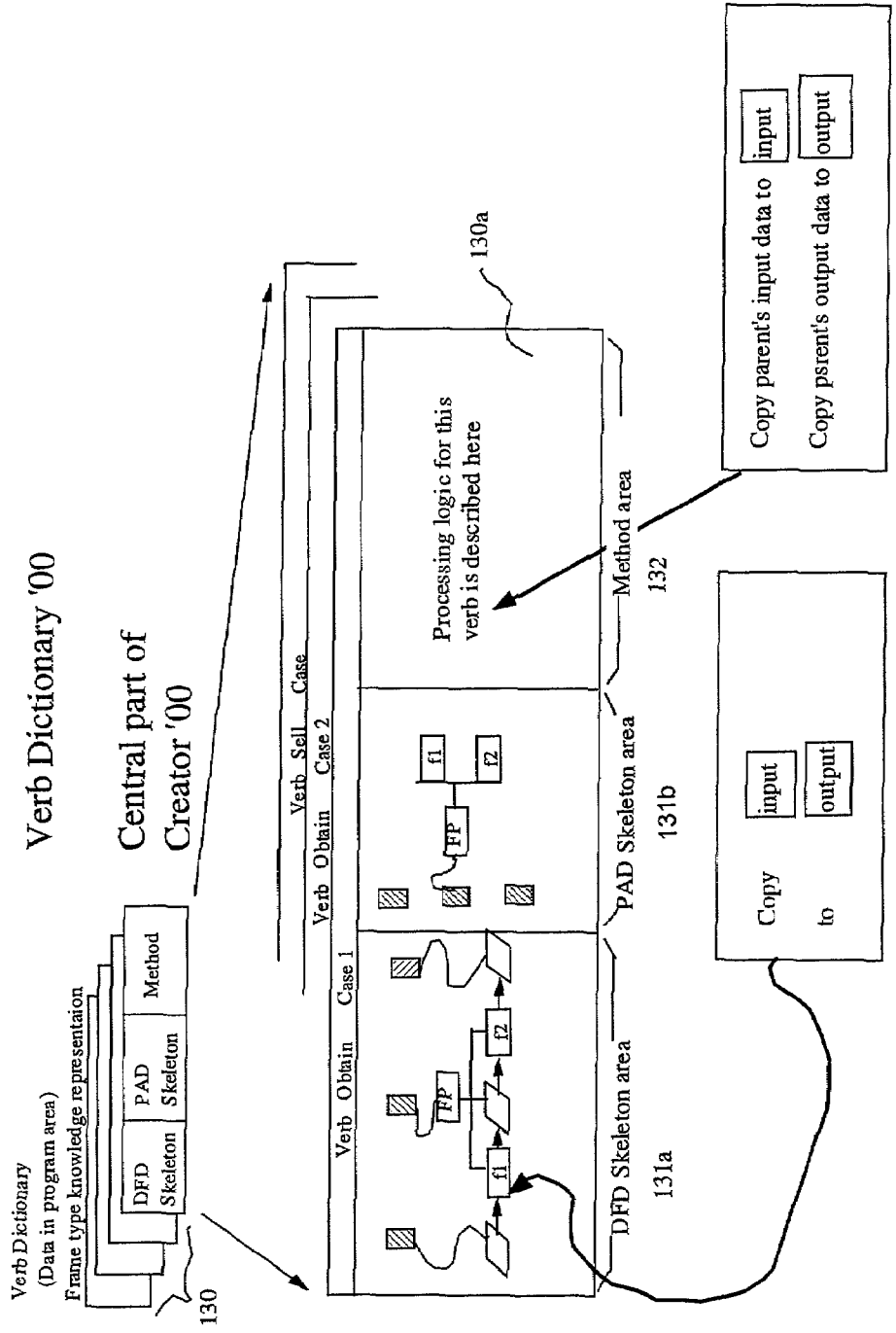
FIG. 13 is for the explanation of the fundamental knowledge for design of the present invention.

Referring to FIG. 13, Verb dictionary is indexed by a verb extracted from the parent concept, and several pages are used for a verb. (When mathematical equations of mathematical processing, the parent concept is expressed by a noun. In such a case, the noun may be converted in a way like "is ○○" or "means ○○".) For a meaning, one page is assigned.

Each page consists of skeleton 131, which is a framework of the child concept, and method 132 for describing processes applied on that skeleton. There are two types of skeleton, for data flow and structured chart. Skeleton in each page is regarded as data. Thus skeleton and method constitute frame type knowledge in Artificial intelligence terminology.

Figure 14:
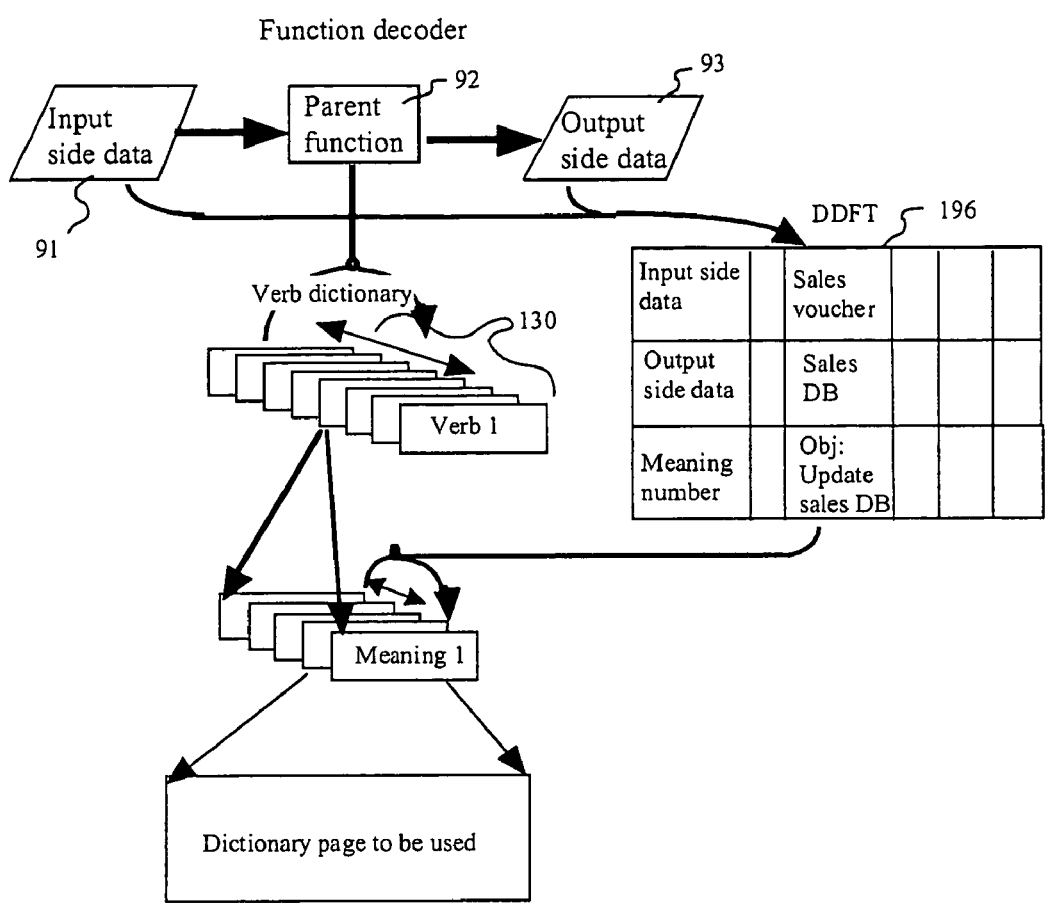
FIG. 14. shows the fundamental concept for "finding the direction of design" in the present invention.

Referring to FIG. 25, DDFT 196 consists of the central part and meaning identification column, where the central part consists of various data columns such as the input data of the parent, the output data of the parent, and other data. In each column, data name, no relation (nil) or to be neglected (don't care) are written. In addition to the central part, there is a column for meaning identification, where the page number of a verb to be used is written. DDFT 196 in FIG. 14 shows a simple example.

The operation is explained using FIGS. 22, 23 and 24 in the case of a verb "Input" putting emphasis on the verb dictionary. Here simplified description, omitting exact description of object, is used.

The first case, where verification is needed, a parent elementary data flow, shown in the upper side of FIG. 22, is used. Where, data is shown with d, function is shown with f, and a serial number is given.

"di Unverified money voucher", "fp Input" and "do Money DB".

In the chosen page of the Verb dictionary, there is skeleton for the data flow. Here, ( ) is a variable.

"d1 (Input)", "f1 Verify", "d2 (Intermediate output)", "f2 Input" and "d3(Output)".

The method in this case is as follows:

1. Copy the parent's input data di to d1 (Input) of the skeleton.
2. Delete the prefix "Unverified" and copy the rest in data d2 (Intermediate output) in the skeleton.
3. Copy the parent's output data do to d3 (Output) of the skeleton.

After these methods are performed, the child concept' data flow in simplified form may be completed. In order to make it in a complete form such as "Perform ΔΔ for (object) ○○", it is enough to insert object word and particles.

"d1 Unverified money voucher", "f1 Verify unverified money voucher", "d2 money voucher", "f2 Input money voucher" and "d3 Money DB".

The structured chart may be obtained by processing in the same way as explained before or by the conversion of thus gained data flow.

In the second case shown by FIG. 23 as well as the third case shown by FIG. 24, following are different from the above-mentioned; the child has no parts to be verified, but it needs a reference file. As an example of these, the second case is explained. The parent concept in this case is as follows:

"d1 Money voucher", "fp Input" and "do money DB".

In the chosen page of Verb dictionary 130 in this case, there is following skeleton. Here, a reference file "dr" is to input to the function f together with the input d1.

"d1 (input)", "dr (reference file)", "f1 Add (input) with (reference file) and "d2 (Output)".

The method for this case is as follows:
1. Copy the parent's input data di to d1 (Input).
2. Copy the paten's output data d0 to dr (reference filet) and the output d2 of the skeleton.

By these operations, the needed children data flow may be completed.

"d1 Money voucher", "dr Money DB", "f1 Add money voucher and money DB" and "d2 Money DB".

The structured chart may be obtained by performing a similar processing or by converting the abovementioned data flow to the structured chart.

FIG. 25 shows DDFT 196 in this case. Where 'dc' denotes 'don't care' and 'nil' is nothing. The table in FIG. 25 shows that, if the input data of the parent has the prefix 'Unverified', 1st page of the verb "Input" in Verb dictionary should be used, If the input data of the parent is "Money voucher" and the output data of the parent is "Money DB", 2nd page of the verb "Input" in Verb dictionary should be used, and If the input data of the parent is "money voucher", and the output data of the parent is "Sales DB", 3rd page of the verb "Input" in Verb dictionary should be used, and the situation is the same as have been shown in the preceding explanation on the automatic decision for the way of design.

These children concepts may be generated automatically by using the aforementioned processing using each page's skeleton.

Using FIG. 1, the basic principle of automatic acquisition of the design knowledge as well as the reproduction of that human design. The explanation is for the case, where specification is the "Clock" (101). In the left side of FIG. 1, there is the specification "Clock", next to it there are design results of data flow design 110 in a stepwise manner and hierarchically. Then the results of corresponding flowchart design 120 are shown. Usually, flowcharts are designed after data flow design, but in this program design 100 by the present invention, designs of flowchart design 120 are concurrently made with the design of data flow design 110.

When design is made by hierarchically detailing in a small step of design, each function in each data flow, consisting of data, function and data, is equal to description of functions in flowcharts. The parent function "Clock" is decomposed to data flows "Obtain time", "Obtain hands" and "Display" hierarchically and detailed.

Adding prefixes d for data and f for function, the 2nd level data flow in the left side of FIG. 1 is d "1 second clock", f "Obtain time", d "Time", f "Obtain hands", d "Hands" and f "Display", and the corresponding flowchart which is shown in the top level flowcharts in the center of FIG. 1 (cf. It is shown also in structured in FIG. 3.) f "Obtain time", f "Obtain hands" and f "display".

In another easy to understand explanation is that, first, a human designer designs a data flow 110 in a small step of design, then the flowchart design 120 is made by converting the data flow to flowchart automatically. As designs in case of branch and repetition, the results do not appear in data flow designs, and the design of flow chart is made. Simple branches and repetitions do not need additional data operations and thus there are no additions on data flows. There are some cases, where data operations are needed for some decision. In such a case, when automatic conversion is made, orphan functions automatically converted appear, the human designer corrects to add the necessary data.

After flowchart design 120, there is coding, or source code design 125. When examined the Fig., it is clearly understood that it is conversions from natural language statements, which are detailed to the most detailed level, to those expressed by computer programming language. Namely, coding is a conversion process to statements expressed by computer programming language, as the last stage implementation mean, and thus coding is a variation of hierarchical decomposition using natural language.

This design results in a hierarchical decomposition chain based on the hierarchical relationship of a parent and the children (e.g. the parent "Clock" is extended to the children of {"Obtain time", "Obtain hands" and "Display"}, and the parent "Obtain hands" is extended to children {"Obtain hour hand", "Obtain minute hand" and "Obtain second hand"}, and taking "Obtain minute hand" as the parent, it is extended to children {"Obtain degree of minute hand", "Obtain the width of minute hand" and "Obtain the length of minute hand".}) Therefore, the accumulation of the design knowledge to Data base 10a, as well as the automatic design by reusing thus accumulated design knowledge.

Thus far, the explanation is made on a case of using flowcharts, the situation is the same as using structured chart, where, in the case of structured chart, the parent and its children relationships shown is shown in a sheet in the right and left relationship and they are performed automatic acquisition of design knowledge and automatic design easily.

The automatic acquisition of deigns knowledge, which is the prerequisite of the present invention is explained. FIG. 2 is an enlarged Fig. to show the detailing process of a data flow shown in the center left of the Fig. A data flow uses a rhomb shaped graphic symbol for data d, a square shaped graphic symbol for function f, and an arrow line to show the flow of data in a sequence of data d, an arrow line, a function f, an arrow line, a data d. In FIG. 2, the upper part data flow shows the parent concept, while the lower part data flow shows the children concept. A dot dash line are drawn between both input data and also both the tail end data respectively for the ease of the reference, and a broken line shows the parent and the children relationship of the function.

FIG. 3 is the structured chart corresponding to the flowchart shown in top of the center right of FIG. 1.

The automatic acquisition of design knowledge on the data flow shown in FIG. 2 is made as following: A starting point mark is set on the center data symbol of the parent elementary data flow for the ease of the processing. Using the model, it starts to trace from the starting point mark to the left side, turning at the end and it traces to the right again. During thus tracing, descriptions on the parent data flow are acquired. Next, it starts tracing from the starting point mark in a turn around to the left, and goes to the starting data of the children data flow, it goes turning to the right and acquires descriptions of the children data flow, and turning to the left returns to the starting point mark. (The starting point mark advances to the next.) By processing acquired descriptions, the relation of the parent elementary data flow and the children data flow is obtained and they become the design knowledge of the data flow.

Automatic acquisition of design knowledge on PAD shown in FIG. 3 is performed as following: The starting point mark is set on a function symbol for the processing.

In a model like explanation: It starts from the starting mark, and traces to the right to reach the first children, hereafter it goes down through each children concepts and returns to the starting point mark. (The starting point mark advances to the next.) During these, descriptions corresponding to the parent and children relations, and they become design knowledge in PAD.

Acquisition of design knowledge is made as above by tracing both (Data flow and PAD) synchronously. Thus acquired both design knowledge are stored in Knowledge base 10a for data flow and PAD respectively.

Next, automatic design of data flow is explained using FIG. 4. An automatic design is performed on a parent data flow in concern, and on each function symbol with its elementary data flow. FIG. 4 shows an application of the present invention. The starting point mark is set on the function symbol in the elementary data flow for making the processing easy. Following is a model like explanation: It starts from the starting point mark and goes to the left at first then goes to the right again, and acquires descriptions on the parent elementary data flow, and thus obtained the parent's elementary data flow as the parent concept is sent to Engines 10, and request the corresponding design knowledge (The output from Knowledge base or the automatically created design knowledge). FIG. 2 shows an example design knowledge thus gained by the request, the children data flow of it is extracted, and it is pasted beneath the initial parent elementary data flow as shown by the dotted lines in FIG. 4. (The starting point mark advances to the next.) After completing automatic design on a parent's data flow, then it goes down, on the children data flow(s), same operations are repeated on each parent's elementary data flow. By repeating these operations, stepwise data flows as shown in the left of FIG. 1 are drawn.

Figure 5:
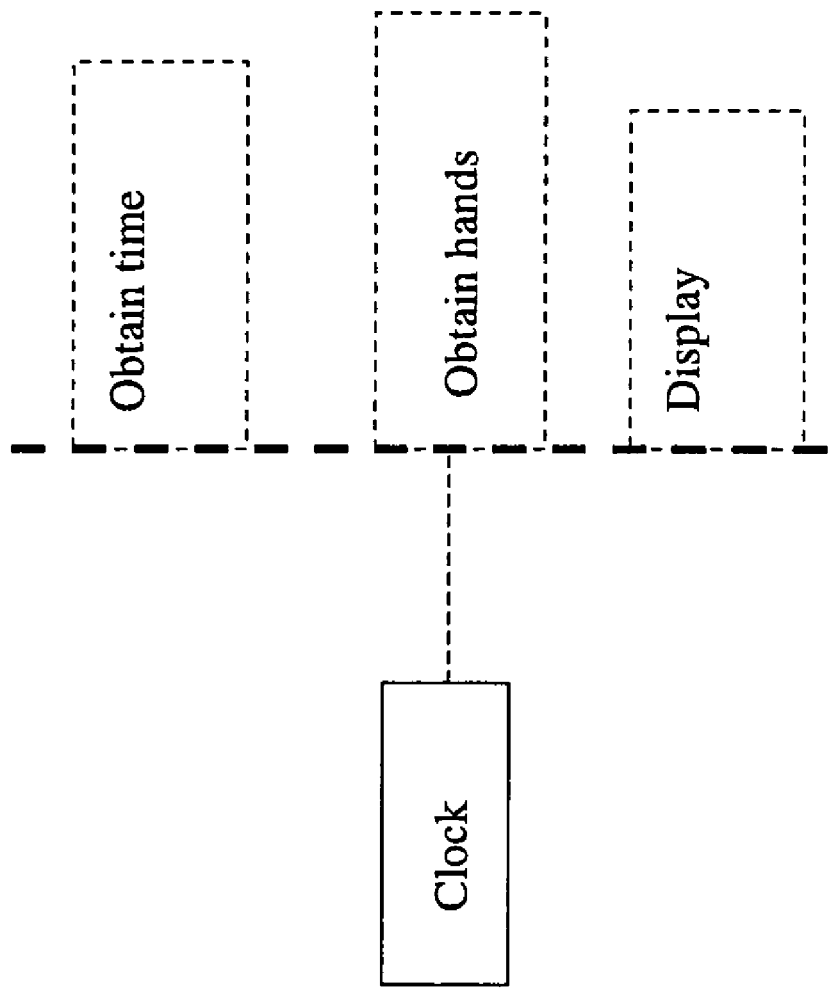
FIG. 5 is a piece of structured chart, PAD, where a parent function and the children function to it.

Next, automatic design in the case of PAD is explained using FIG. 5. Automatic design is performed on parent functions in concern, by repeating at each function. FIG. 5 shows an example. Set the starting point mark on the left side parent function symbol for the processing. The description is read out from the parent symbol, and refers to Engines 10. Thus, the design knowledge as shown in FIG. 3 is obtained, and the children concept (group) is pasted on the right side position of the original parent function as shown by dotted lines. (The starting point mark advance to the next.) The automatic design is repeated in the parent level, when they finishes, do the same in the children level. When the series of operations are completed, a tree like PAD extending toward to the right may be completed.

These automatic design operations are made both on data flow and PAD synchronously. During these operations, design information is checked their match, for improving the reliability.

In the early phase of systems design, the control as expressed by PAD is almost unnecessary, and started from systems design, when the design reaches the last stage of program design, data flows are almost unnecessary. In order to work in such a one lung-like operations and also operate in case of the temporal loss of one side information, the system can continue to work by creating the missing information.

Figure 6:
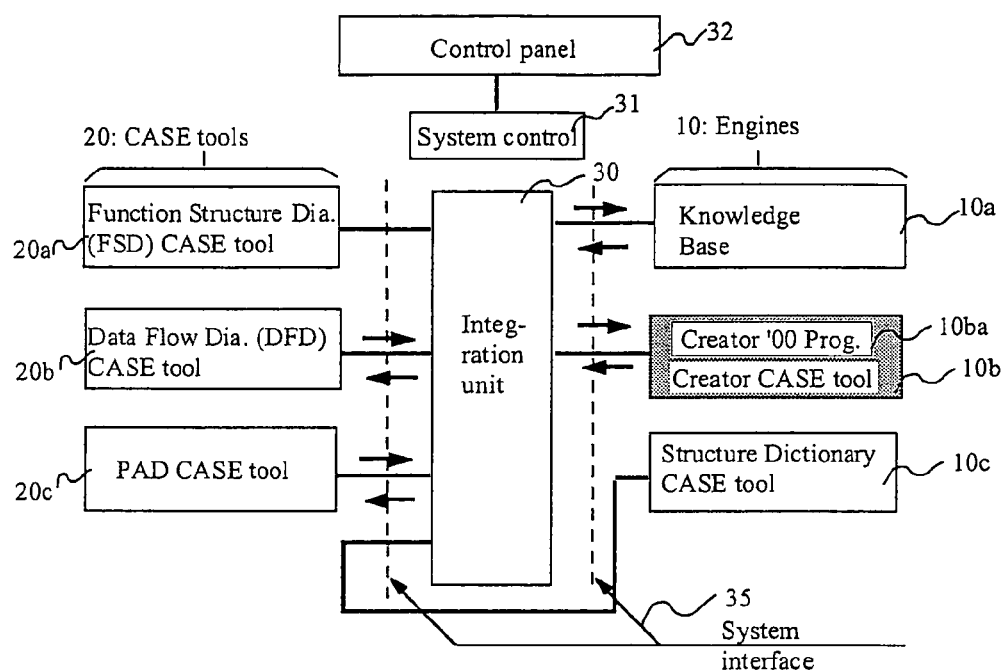
FIG. 6 is a model diagram of the automatic design system to show one example of the present invention.

Next, an actual system of the present invention is explained using FIG. 6. FIG. 6 shows the model diagram of this automatic design system.

The automatic design system of the present invention consists of CASE tool group 20, Engines 10 that, on receiving a parent, respond the design knowledge, namely the pair of the parent and the children, Integration unit 30 for information exchange between the above to groups and System control with Control panel 32.

CASE tool is an abbreviation of Computer Aided Software Engineering tool. A CASE tool, in general, is operated by a designer, perform following functions in some kind of Software Engineering rules and practices; prepare design documents, check them, and store them in files, read out design documents from files and display, to edit them by mixed use of above, and thus support the designer acting as man-machine interface, where documents or graphics are used. In the present invention, each CASE tool is enriched with the automatic design capabilities namely the automatic detailing by design knowledge, where detailing of design documents are made by human designers or by the aforementioned automatic designs and also automatic acquisition of design knowledge.

In the left side, CASE tools (Computer Aided Software Engineering tool) 20b, of which the data flow CASE tool 20b as well as PAD CASE tool 29c are shown below. A function structured (FSD) CASE tool 20a is upper left side and is provided for controlling two kinds of documents used for the above tools, it is outside of the present invention and no further explanations are neglected. Namely, in CASE tools 20, there the are data flow CASE tool 20b and PAD CASE tool 20c.

In the upper right side, there is Engines 10. They respond design knowledge responding the parent concept information of the design knowledge. In the upper part, there is Knowledge base 10a, bellow it, there is Creator CASE tool 10b with Creator program 10ba, which plays the central part in the creation of the design knowledge. This is the central part of the present invention working together with Structured dictionary CASE tool 10c shown below, and will be explained later in detail. Summarizing, Engines 10 consist of Knowledge base 10a, Creator CASE tool 10b, which includes Creator program 10ba for creating design knowledge automatically and Structured dictionary CASE tool 10c for defining structure of input and output forms and files.

Integration unit 30 in the center performs integration functions by supporting communications between CASE tool(s) 20 and engine(s) 10, and various collaboration functions needed for co-working various CASE tools and various engines. Besides these, Integration unit has functions for CASE tools 20, and functions for Engines 10. Its interfaces for both sides 35 are standardized to make the system to be open-ended and to enable various combinations of various CASE tools and various engines.

Control panel 32 shown at the top is man-machine interface such as input means, like keyboard and mice, and output means, such as displays. System control 31 is provided for controlling the entire system.

The automatic acquisition of design knowledge and the automatic design are explained using FIG. 6. The case, where Knowledge base is used, is explained first. The Knowledge base 10a consists of two internal units, that for data flow and that for PAD. CASE tools 20 (FSD CASE tool 20a, DFD CASE tool 20b and PAD CASE tool 20c) acquires automatically design knowledge and the information is sent along the right pointing arrow to respective Knowledge base 10a, and Knowledge base 10a check respective information referring to already stored information and accumulate one when the newly coming information has not yet been stored. In automatic design, the parent concept information from CASE tools 20 flows along the right pointing arrow to Knowledge base 10*a*, and if the referred information exists in Knowledge base 10*a*, if Knowledge base 10*a* has design knowledge on the referred parent concept, it responds to sends it. This time the information flows from Knowledge base 10*a* along to the left side point arrow to CASE tools 20, where the automatic design is made.

The right side interface of Integration unit 30 is common to all the units in Engines 10. When the parent concept information is given to Creator CASE tool 10*b*, it creates the children concept information and returns the design knowledge. Both CASE tool 20*b* and CASE tool 20*c* perform automatic design in the same way as the case of knowledge base. Integration unit 30 compares operations of CASE tools in CASE tools 20, converts design document information between each CASE tool and exchange them in between them, selects each engine to work respective use or to work together, and transmits design knowledge created in Creator CASE tool 10*b* to Knowledge base 10*a*.

Figure 7:
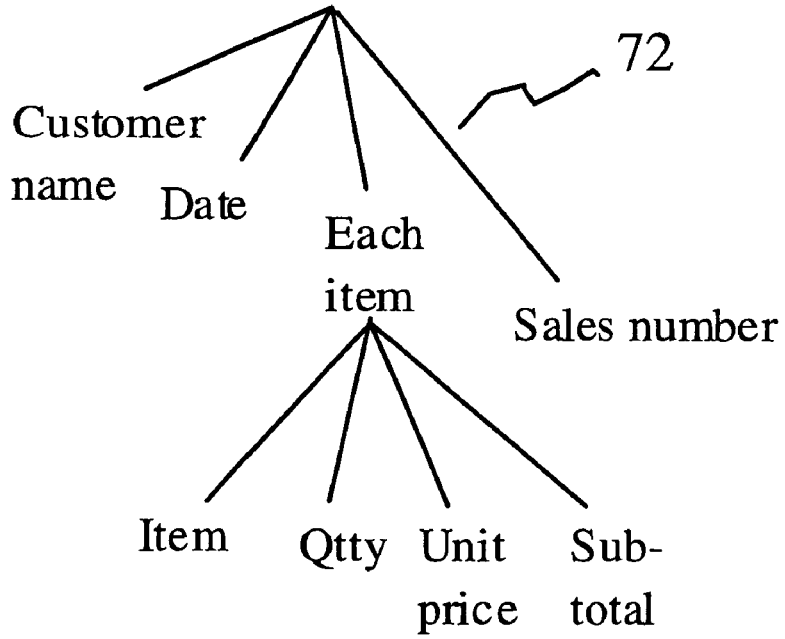
FIG. 7 is an example data for the explanation of structure dictionary CASE tool.

Next, functions of Structured CASE tool 10*c*, shown in FIG. 6, are explained using FIG. 7. Structured CASE tool 10*c* is provided for defining structures of input and output forms as well as files, which is used by Creator CASE tool 10*b* for generating design knowledge automatically. FIG. 7 shows an example of Sales voucher 71 in a simplified form at the top, and shows the corresponding data structure at the bottom. Sales voucher 71 is regarded as Frame type knowledge, and is expressed in a hierarchical expanding network. Namely, Sales voucher 71 is expressed as a hierarchy of customer name, date (year, month, day), slip number, and 'items' which may be expressed in a table. Data structure 72 shown in the bottom shows the hierarchical structure. 'Items' in it are further hierarchically decomposed to name of sold item, quantity, unit price and sub-total.

Figure 8:
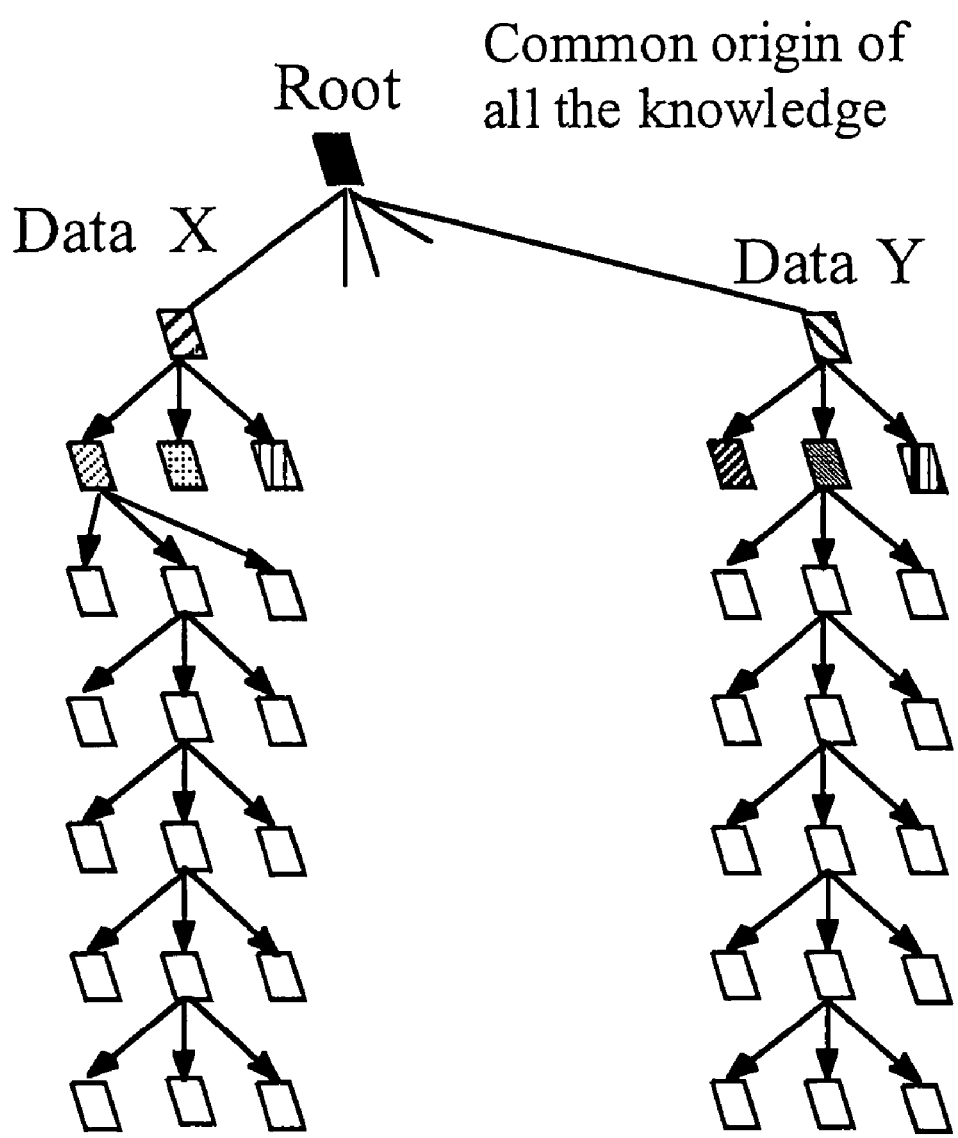
FIG. 8 shows the hierarchical diagram to show the knowledge structure of Creator CASE tool.

FIG. 8 shows the structure of these data to be used for the processing in Creator CASE tool 10*b*. Each data of input and output forms and files are integrated into one Root. When the name of a form or a file is specified, starting from Root (The common origin of all the knowledge) any data in it may be accessed and also data located further downward may also be accessed. Thus repeating, any data may be accessed by specifying like the level, for example Sales voucher*items*subtotal.

Creator CASE tool 10*b* shown in FIG. 6 is a platform for creating design knowledge automatically, which consists of Creator program 10*ba*, which is the central core of design knowledge and has the fundamental design knowledge of respective area to be designed automatically, and Structure dictionary 10*c*, which is influenced by the area to be designed automatically.

The main structure (central core of Creator'00) of Creator program 10*ba* is Verb dictionary 130 as shown in FIG. 13, and DDFT table 196 (shown in FIG. 14). Verb dictionary 130 has fundamental design knowledge for automatic design. In this example, the knowledge is expressed by Frame type knowledge, and a Frame is provided as to correspond to a meaning of a verb. Similarly to the case of FIG. 8, it is connected to Root, and by specifying a verb; the corresponding Frame 130*a* may be accessed. Generally, a verb has several meanings, and Verb dictionary is used with DDFT for selecting the meaning of the verb. A frame page 130*a*, as shown in FIG. 13, consists of data areas 131*a*, 131*b* and the method area 132. The former data areas 131*a* and 131*b* are for data corresponding to respective meaning of a verb, and in more detail, also Skeleton 131. Skeleton 131 consists of one for data flow (DFD skeleton) 131*a* and another for structured chart (PAD skeleton). Method area 132 includes detailed processing procedures for this case. A typical example is, to copy the input data of the parent concept to "Input" 94 of the children concept, and another is to copy the output data of the parent concept 93 to "Output" in the children concept, and so on.

Next, Skeleton 131 is explained using FIGS. 9, 10 and 11. FIG. 9 (for a case of sales) and FIG. 10 (for a case of buy) are two different cases of the same verb "Input", and the respective design rules are shown in the respective Figs. In these Figs, the parent elementary data flow is shown in the top area, while the corresponding children data flow is shown in the bottom area. Comparing two cases of FIG. 9 and FIG. 10, these central parts of the hierarchical decomposition relationship of these, as the parent and the children, are "Input" (92*a* and 92*b*), "Verify" (95*a* and 95*b*) and "Input" (97*a* and 97*b*), and they are shown in FIG. 11. Namely, FIG. 11 is the abstracted framework from these two cases (Skeleton: "Input" 92 is detailed to "Verify" 95 and "Input" 97).

Comparing FIGS. 9 and 10 further, the initial input 91*a* and 92*a*, of the parents of the children data flow, are inherited to the initial input 94*a*, 94*b* of each children data flows. The intermediate data 96*a* and 96*b* are derived by deleting "Unverified" form these input 94*a* and 94*b*. Finally, output 98*a* and 98*b* inherit the parent's output data 93*a* and 93*b* respectively.

The framework (skeleton) common to these two cases is shown in FIG. 11, which can reproduce both of two cases of FIG. 9 and 10. Namely, the skeleton shown in FIG. 11, which is common to these cases, can reproduce respective design knowledge (design rule).

Next, this reproduction of design knowledge (design rule) is explained in detail. Out of plural frame type knowledge representations, by specifying a verb, the corresponding Frame 130 is chosen. For example, a parent data flow, shown in FIG. 9, method (Processing logic operating on skeleton 131) 132 reads the parent's input 91*a* and insert it to the children data flow's top input data 94. Next, method 132 reads the information, which is read out previously from the aforementioned input data 94, and deletes the prefix (Unverified) and copies the rest to the intermediate data 96. Furthermore, method 132 reads the output data 93*a* of the parent's elementary data flow, and copy it to the final output data 98, which is the tail end output data of the children's data flow. Thus the design rule shown in FIG. 9 may be reproduced. By taking the same procedure, also FIG. 10 may be reproduced. (In both FIG. 9 and FIG. 10, the children's function includes object word. As the addition of the object is not necessarily needed, it is omitted. If necessary, it may be added by the similar procedure.)

Figure 12:
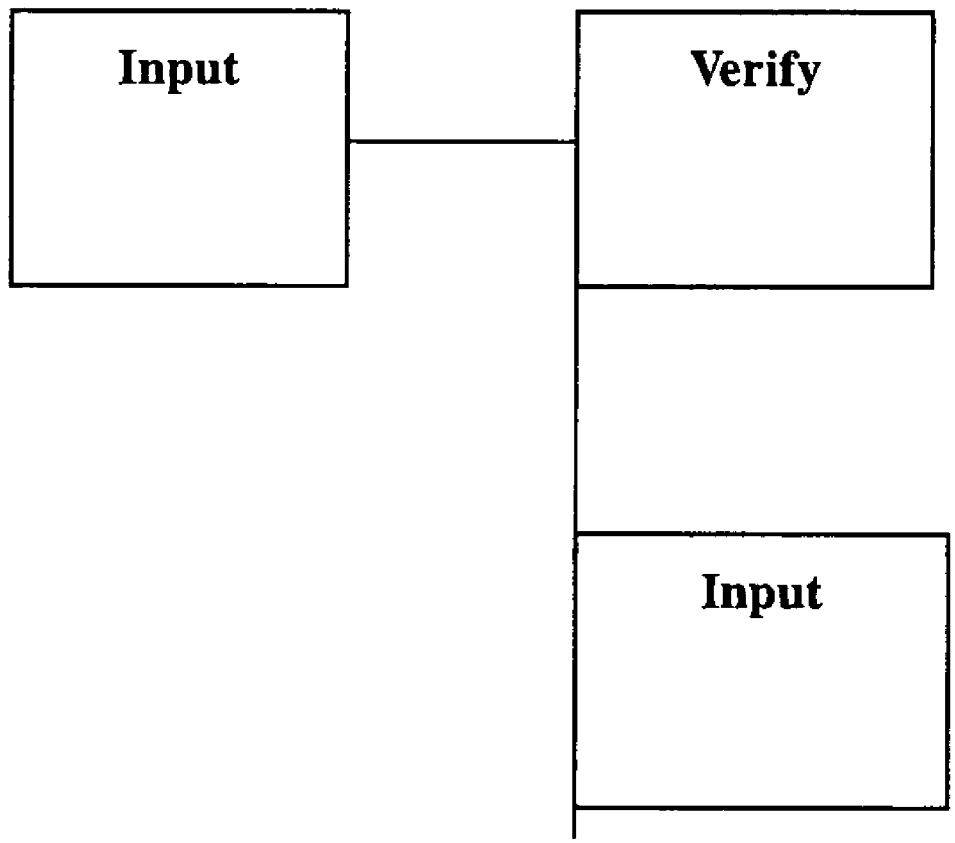
FIG. 12 show a piece of structured chart (flowchart) of the present invention.

This children concept includes two functions 95 and 97, they must be specified their execution sequence. This may be achieved by specifying PAD (flowchart) as shown in FIG. 12. FIG. 12 is PAD representation of the skeleton 131*b*, and the parent concept "Input" 92 is decomposed to the children concepts, which are first "Verify" 95 and then "Input" 97. Similarly to the case of data flow, it is possible to process by method 132 on the skeleton 131 to obtain the specified results. But, it is also possible to obtain by converting the created data flow.

As have been shown, when the input 91, the function 92 and the output 93, where all are of the parent, are given, using the lower level fundamental knowledge, namely Skeleton 131 and the method 132 (processing logic operating on Skeleton 131), the aforementioned parent's children concepts 94, 95, 96, 97 and 98 are created, namely, the design knowledge which is a pair of the parent concept and the children concept(s) is automatically created.

Referring to FIG. 9, this case aims at to update Sales DB by the new input. In FIG. 10, this case aims at to update Buy DB by the new input. In order to attain these objects, the input to the parent is Sales voucher in FIG. 9 and Buy voucher in FIG. 10 is chosen respectively. Considering the origin of these design rules, it is understood that, once the object is determined, 1. the output of the parent concept
2. the input of the parent concept, and
3. the algorithm of the processing are determined.

In the cases of FIG. 9 and FIG. 10, from the descriptions of the input 91, it is understood that the input has not yet been verified. Thus the "Verify" stage is added prior to the sequential processing 97. The explanation is omitted inn order to avoid repetition, but in the next stage design rule, processing of "Input" may be decomposed to respective way to respond to the object given.

In Software Engineering, the concept of Object tree is already known. It means that starting from the final object, it is hierarchically decomposing it to several 'means to attain it'. In the next, take one of the 'means to attain it' as the new object, and repeat to decompose hierarchically similarly. Thus repeating, a hierarchical tree may be obtained.

Beneath the object plain, there is a function plain where data flows and structured charts for representing programs are drawn. In a human design, the person, drawing the object tree in the brain, designs the hierarchical decomposition from a parent concept to the children concept(s) as to they meet the chosen object. If this is modeled, the automatic design becomes as follows: First determine the output to the parent concept, then choose the input to the parent concept, finally determine the processing, which effects following processing.

Although it is an idealistic way, but is not practical, as it requires projecting the object tree image in the brain on a plane of a chart or a diagram. From practical viewpoint, it is desired that the processing remain only in the program domain. As an approximation to this, the decision may be attained by the output 93 and the input 91 both of the parent.

In the case of FIG. 9 and FIG. 10, the explained design rule, it appears in the automatic design of the following design rule. It happens by the fact that the input bears "Unverified". If it did not bear "Unverified", the targeted processing would be made to increase sales or buy.

In FIG. 9, if the input to the parent 91a were "Money voucher", as it cancels the sales, the algorithm would be to decrease from sales DB by that amount. Namely, the verb "Input" which is the center of the parent concept has several meanings as governed by its input data 91 and its output data 93, aa: increasing case of the output by the input,
bb: decreasing case of the output by the input,
cc: verifying case,
and so on.

As an approximation, in following cases;
a: If the input and the output are as shown FIG. 9 and FIG. 10, then take the aforementioned aa,
b: If the input is Money voucher and the output is Sales DB, then take the aforementioned bb, by above, it is possible to select one out of several meanings. In this case, it is possible to select one out of the several meanings of the verb. Namely, it becomes possible to organize the automatic selection logic using the input and the output, both of the parent concepts.

Especially, in the following case:
c. If the input bears "Unverified", then aforementioned cc. where this must be performed prior to others.

In this case, especially in the aforementioned case a, the logic for selecting automatically may be obtained by considering the design rule preceding the said design rule.

As a result of studies on various cases, it was found that:
The input data or the output data or both, of the parent concept,
The input data, the output data or both, of the preceding design rule,
A part of the input information, the output information or both, Taking these as the input, the automatic selection logic may be organized. This is understood that they determine the way of design (the direction of decomposition). As various information groups correspond to ways of design (the direction of decomposition), it is fitted to implement it by table logic. In this example of the present invention, a table named DDFT 196 has been provided for this purpose. Namely, DDFT 196 stores the logic to extract the meaning of the verb, used in the parent concept, by the input data, the output data, both from the parent concept and preceding parent concept(s).

When a parent concept is decomposed to get the children concept, as the parent concept has several meanings, it becomes necessary to select the suitable one. As has been mentioned before, the initial automatic design system reusing design rules, it is necessary to select the suitable one by the human designer. By integrating the aforementioned logic, the automatic selection has becomes possible.

As has been mentioned, among the first object of the present invention, the mechanism 'to decide automatically the suitable way to decompose design' has become clear.

Next, the concrete structure of the mechanism 'to generate design knowledge', which the present invention features, is explained next using FIG. 13. In the top of FIG. 13, items constituting Verb dictionary are shown. One term of Verb dictionary corresponds to a meaning of a verb, which, logically, is information as expressed using Frame type representation. Data 131 in a frame 130a, in this case, consists of the skeleton 131a for data flows, and the skeleton 131b for PAD. The method 132 in Frame 130 is shown in the right side of this FIG. 13.

In the center part of FIG. 13, the detail is shown. The skeleton 131 corresponds to the children concept, and it contains information related to only the children concept of a design rule, and thus the false parent (FP) is provided for representing the parent concept, for the purpose of the processing. In order to show that this corresponds to the parent function, the hatched symbol above the false parent (FP) is to connect 92, and the hatched symbols 91 and 92 are shown which correspond to the input and the output, both data of the parent function, respectively. The children concept group is shown by the data flow 94 to 98 having functions f1 and f2. In the bottom part of FIG. 13, examples of the method 132 are shown.

The right side example in the bottom of FIG. 13 shows that the input data of the parent concept (including the data in the previous states) is copied to the input data area 94 as represented 'copy input in the square symbol'. The output 93 is shown in the similar way. In this example, the most strict expression "Perform XX ○○ to ΔΔ" is simplified to just "Perform xx", and the inside of the structured chart is not changed.

Next, how function decoder decides the way is explained from the viewpoint of the structural concept. The top part shows the parent's data flow as the input to the automatic generation. The verb is extracted from the function part 92, and is used for referring to Verb dictionary 130.

DDFT table (The logic for extracting the meaning of the verb in the parent concept is stored.) 196 (The concept is shown in the right side of FIG. 14, and the detailed example is shown in FIG. 25.) is referred by the input 91 and the out put 93, both of the parent concept. As a result of this reference, it becomes possible to select the appropriate (It means that 'it is desired'.) unit information out of the group of the unit information (It consists of skeleton 131, the center part of which is a verb, and the method 132.) for the children concept(s) referred by the verb part of the parent concept using Verb dictionary 130. For example, as is shown by the arrow line, the fact that the input 91 is Sales voucher and the output 93 is Sales DB, determines the meaning of the verb, and it is estimated that the object is "Update of sales". This is then converted to the information for the selection of the corresponding meaning of the verb, and the specified meaning (case) out of, for example, five possible meanings of the said verb. Thus, the selected term out of the dictionary terms, as mentioned above, the method 132 operates on the skeleton 131 to form the child concept(s). Processing patterns of methods are: on the skeleton' input and output data To insert the input and the output, both of the parent or the detailed data as hierarchically decomposed from the parent's input and output data, To prepare the intermediate data of the skeleton, to insert object words or particles in descriptions of children function, and so on, The amount of the processing is light and the processing is easy. Furthermore, the design information is graphical, and is shown as the description in symbols, and the children concept is easy to understood by any people, and all these enable the above work simple and easy.

There are various cases in design. Up to now, the explanation has been made on the most fundamental case. Besides the aforementioned cases, there are many other patterns. As the typical of them, Jackson Structured Programming case, which is used frequently in business data processing, is explained. The explanation is on the design shown in FIG. 1, "Time" and "Hands" in the second level data flow are hierarchically decomposed to be "Hour", "Minute" and "Second" as well as "hour hand" "Minute hand" and "Second hand" respectively from "Time" and "Hands". Furthermore, functions "Obtain hour hand", "Obtain minute hand" and "Obtain second hand" correspond each pair of the input and the output. These are also hierarchically decomposed from the upper function "Obtain hands", and they show parallel data flows. This kind of design rule is named JSP type design rule.

Such a pattern where matched hierarchical decompositions of both input data (including the previous state) and output data (including the new state) and each function connect the matched pair of the input and the output, and thus the parent function is decomposed in parallel is a characteristic of JSP (Jackson Structured Programming).

Figure 15:
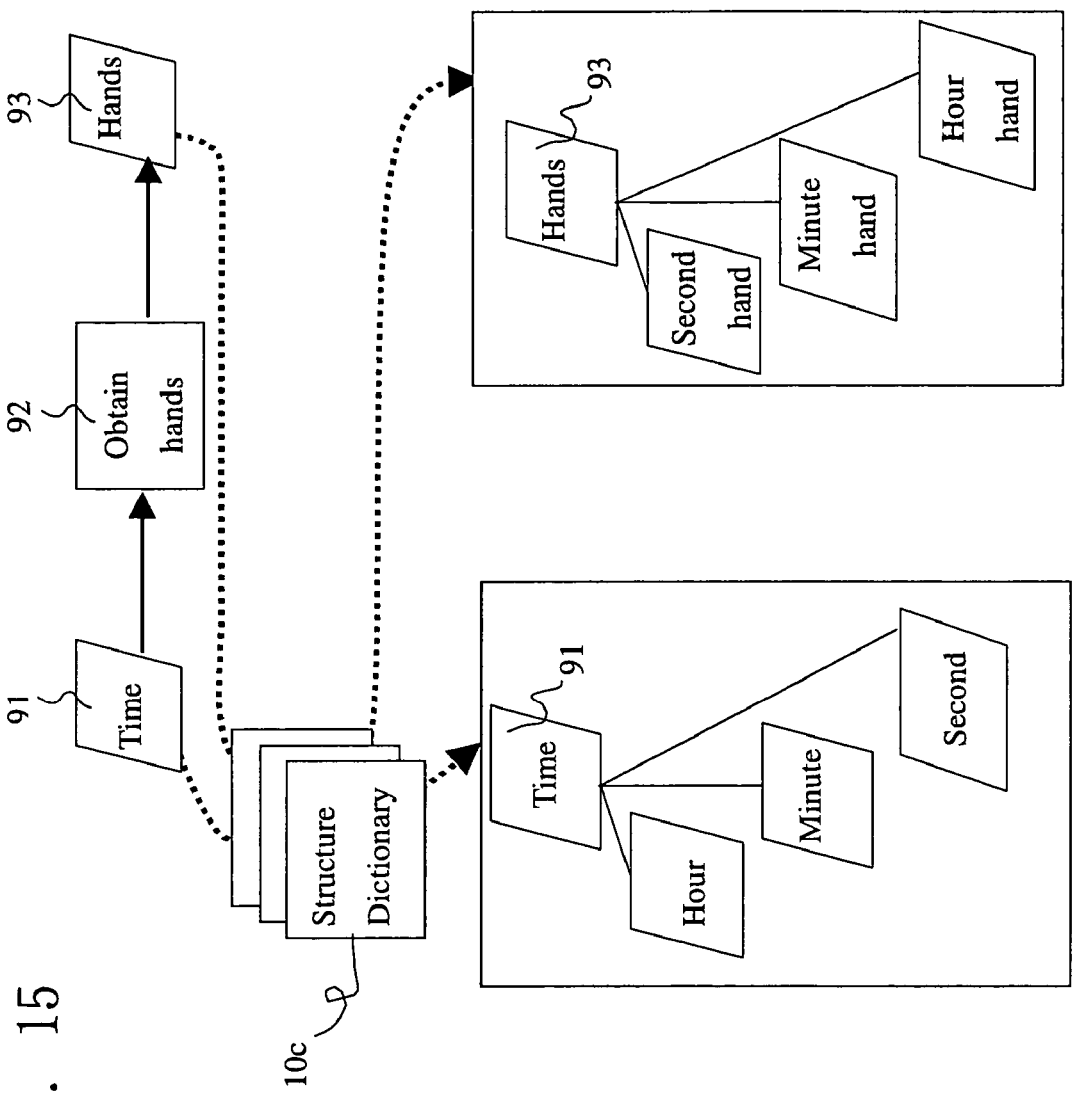
FIG. 15 shows a part of function decoding for Jackson Structured Design in the present invention.

FIG. 15 shows the formation process of children concepts in this case. The input data 91 and the output data 93 are hierarchically decomposed by structured dictionary 10c. Namely, "Time" is decomposed to "Hour", "Minute" and "Second", while "Hands" is decomposed to "Hour hand", "Minute hand" and "Second hand" respectively. The case where both the input and the output are hierarchically decomposed, like this, is JSP type design rule, and it is detected, JSP unit works as follows.

Figure 16:
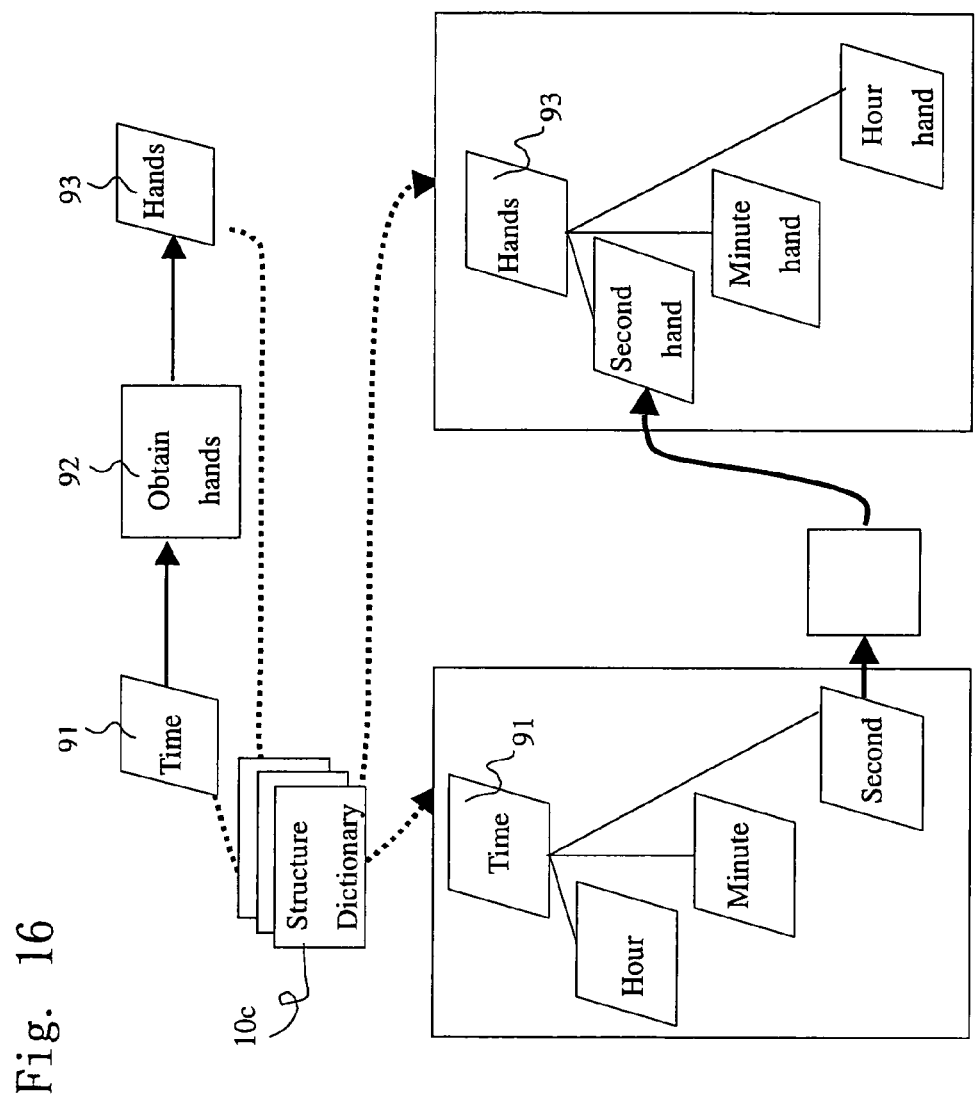
FIG. 16 shows the first phase search process.

FIG. 16 shows the first step search. In this case, "Second hand" is chosen first, it searches the hierarchically decomposed input data of "Hour", "Minute" and "Second" sequentially, and the coincidence of "Second", or the common meaning, is found and selected as the pair. Connecting the input (not only data but also data in the previous state is included.) and the corresponding output data (including data but of the post-state) and an empty function box constitutes a data flow, leaving the name undefined. Thus, the function is called a XXXXXX function.

Figure 17:
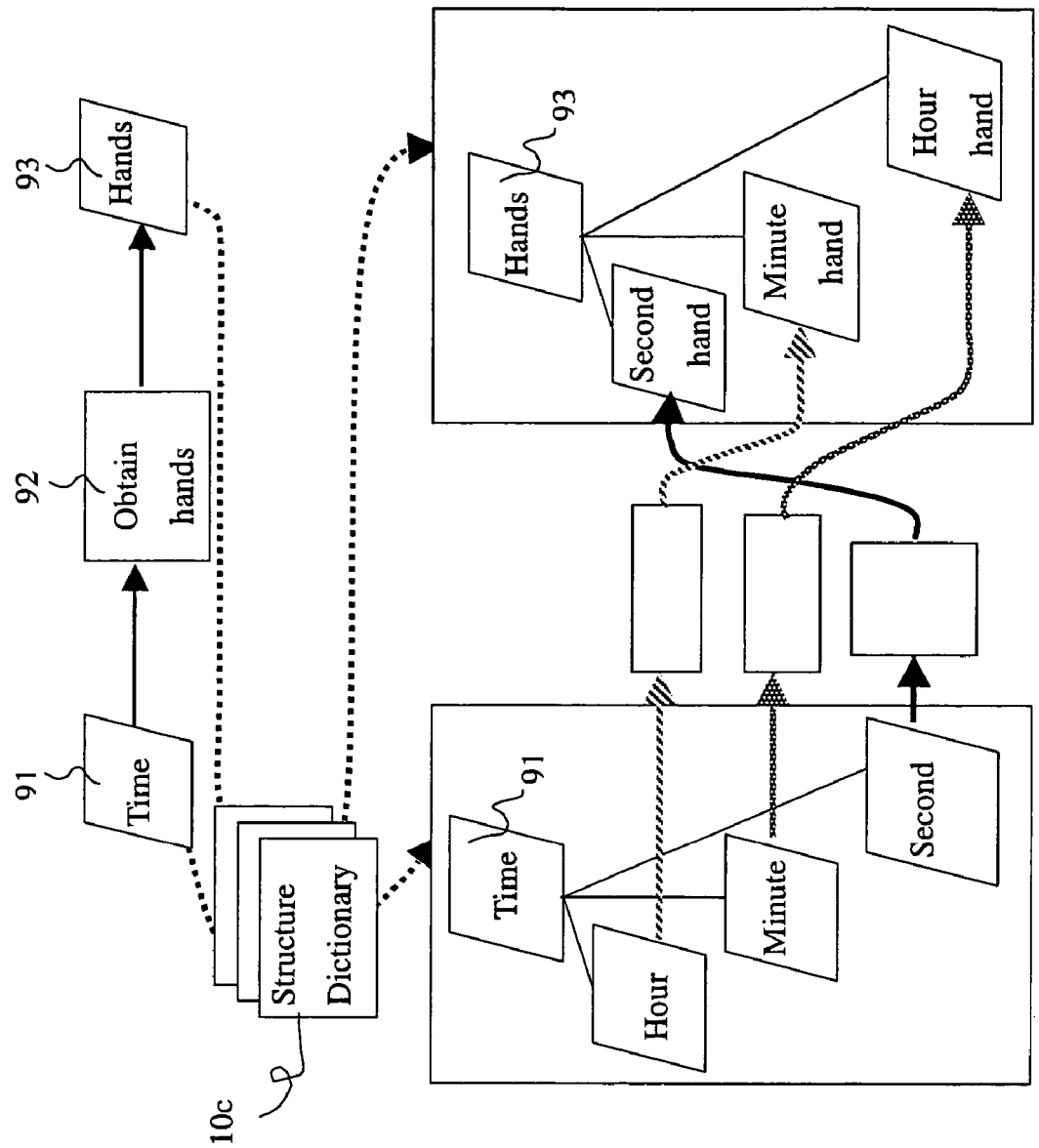
FIG. 17 shows the completed form after repeating the processes shown in FIG. 16, and the completed data flows connecting all the data of hierarchically decomposed.

FIG. 17 shows the state after the similar search has been made, and where data flows of all the pairs of hierarchically decomposed input side data as well as the output side data are formed.

Figure 18A:
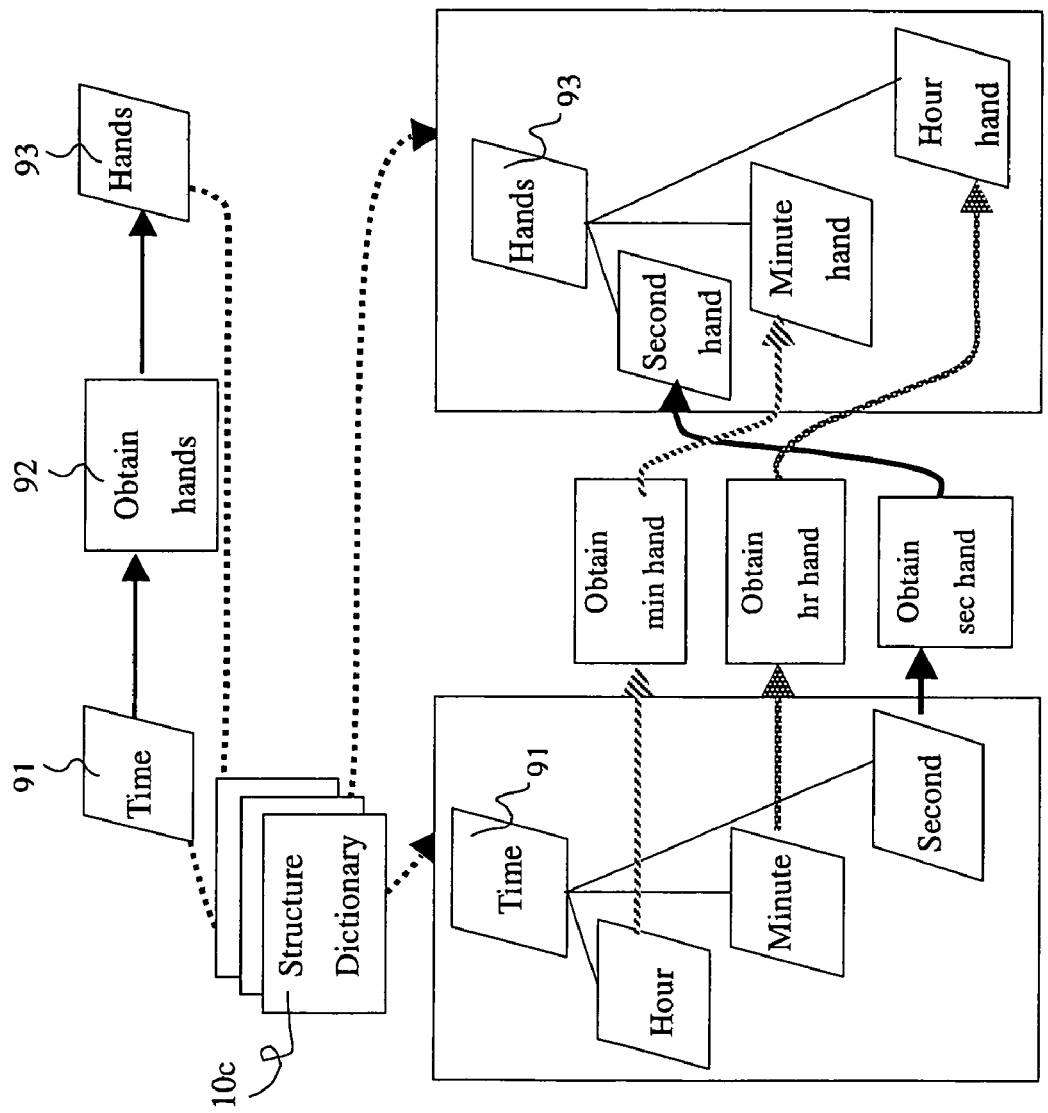
FIG. 18A shows the completed form of FIG. 17 where all the empty boxes are processed.
Figure 18B:
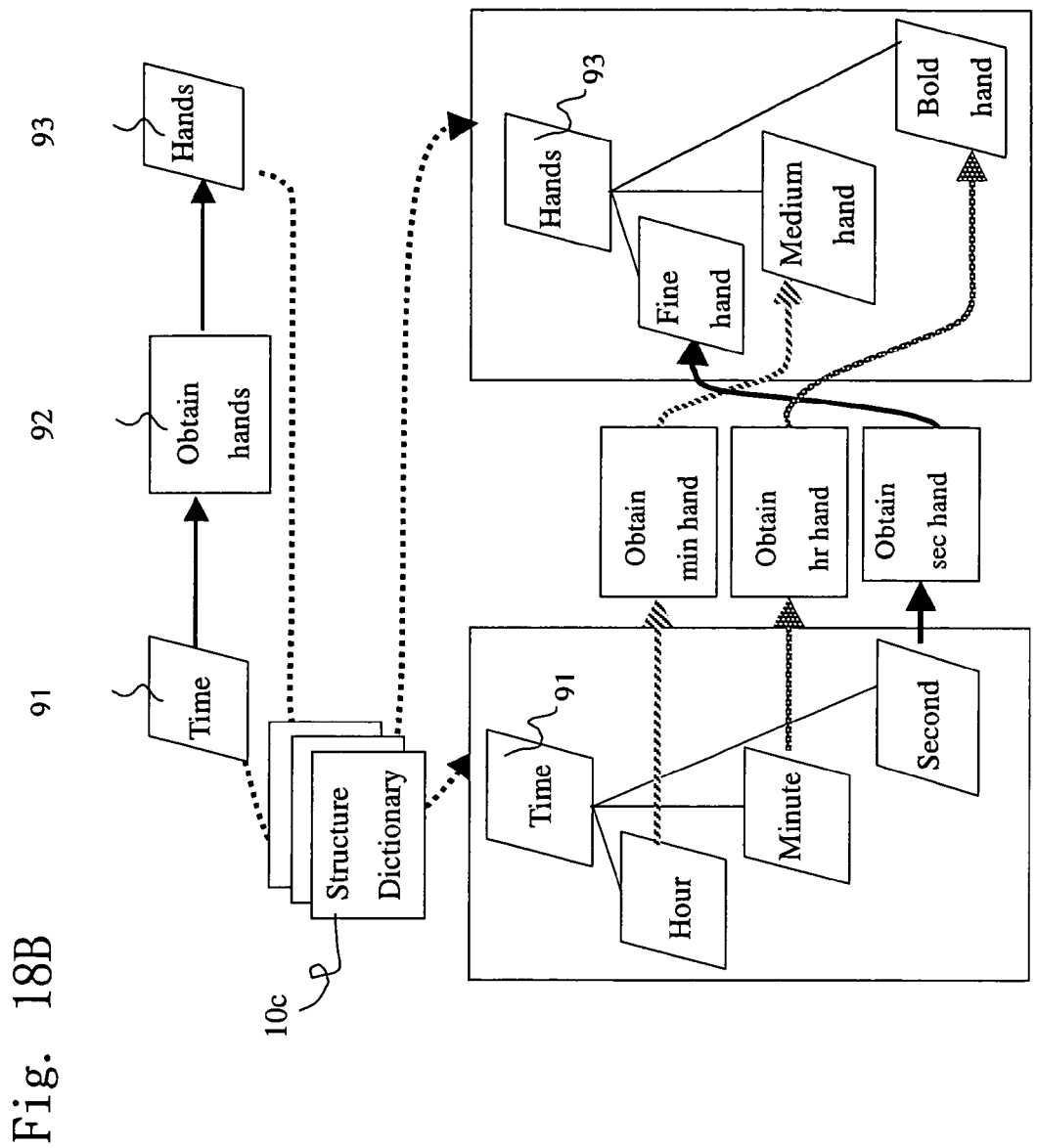
FIG. 18B shows a sample result in the present invention designed by applying micro design rule.

By inheriting the verb in the parent concept, the description is prepared as "Obtain XX", and next, the output side data is chosen as the object word "Second hand", as a result of these two steps "Obtain Second hand" may be formed. By repeating this operation to complete the description for all the phantom functions. FIG. 18a shows the results, where data flows for the child functions are formed.

In case when children as a whole have plural verbs, not from the parent side, but the verb contained in the skeleton as the children concept is used. By converting thus formed data flows to structured chart PAD, the children concept in PAD may be formed, and thus JSP type design rules may be automatically created.

There are several variations of JSP type processing. One pattern is to perform Function Decoder prior to read Verb dictionary. While another does after the verb dictionary has been accessed. Various small special processing may be included in a method or subroutines. The more difficult and typical processing patterns constitute an independent process as the name JSP unit implies, and collaborate with the min methods.

Thus far, two typical processing patterns are explained. Based on them, various variations of processing may be designed to generate the children design knowledge from the parent design knowledge. Thus the second object of the present invention to create design knowledge has been attained.

Figure 19:
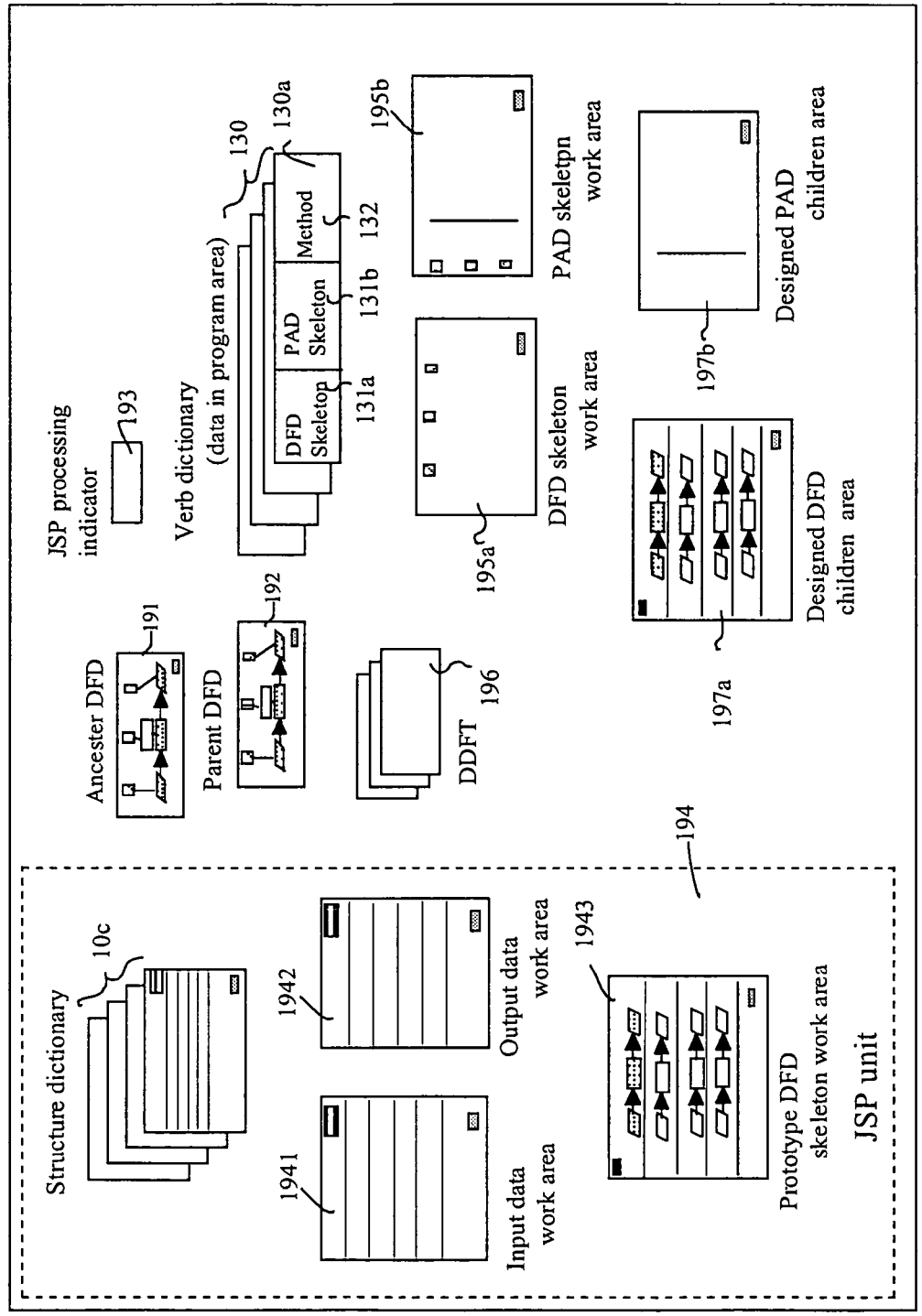
FIG. 19 shows the internal structure of automatic design unit in the present invention.

Next, the internal structure of this automatic design system is explained putting emphasis on the automatic creation using FIG. 19. The direct input to the system is the parent concept elementary data flow 192, which is shown in the center of the Fig. Preceding ancestors' elementary data flows to be referred during processing were grouped and named as ancestors' DFD 191. Especially in the case of JSP type design the initial parent is important, and JSP processing indicator 193 is set at the beginning of JSP processing, and is referred for the identification.

JSP unit 194 shown in the left side of FIG. 19 is a dedicated design function unit for JSP type design. Both parent's input data and parent's output data are decomposed hierarchically by structure dictionary 10c, and recorded to respective data work area 1941 and 1942. This is performed after the parent is set, and during the function is being function-decoded.

On the other side, the verb in the parent concept is extracted, Verb dictionary is referred by the verb, and a group of pages of the dictionary are read out to be candidates to be used. Referring to DDFT 196, where the parent's input and output are gathered, a page of Verb dictionary to be used is identified and from thus determined page 130a is developed on skeleton work areas 195a and 195b.

When the case is not JSP type, the method applies the processing on Skeleton and thus created children concepts are output to Designed children area 197a and 197b respectively.

In case of JSP type, the input data as well as the output data are processed as shown in FIG. 17 already, and thus created prototypes are prepared in Prototype DFD skeleton work area 1943. Then, they are processed, as FIG. 18a shows, to be the standard description (e.g. "Obtain hour hand", "Obtain minute hand" and "Obtain second hand") and stored in Designed DFD children area 197a, then it is converted to PAD and it is recorded in Designed PAD children area 197b.

Referring to FIG. 6, based on Creator (an engine for automatic design) CASE tool 10b and together with Verb dictionary 130, the object, structure, and function of Creator program 10b have been explained. Creator CASE tool is the platform for these operations, and it works with the same interface as knowledge base 10a.

Next, Knowledge base 10a, which is an engine for automatic design by simple reuse. The central technology of an ordinary knowledge base has been established already, it is not explained but on the automatic selection of design knowledge which is the specialty in the present invention.

In Knowledge base 10a, there are tow knowledge bases; one for data flow and another is for PAD. There are two kinds of the parent information for referring data flow knowledge base. They are the parent elementary data flow and the function in the parent elementary data flow.

Generally, a parent function has several meanings. Namely, as several design knowledge, design rule, might correspond to a parent concept, and the human designer selects and specifies. As has been explained before, when both input and output data are also specified for a function, the meaning of the parent is fixed, and the design knowledge or design rule to be used is also fixed. Therefore, there are two cases when automatic selection of the design knowledge.

Referring knowledge base of structured chart PAD
Referring knowledge base of data flow The former case appears when designs near source code, data flow is not used anymore and only structured chart is used. The latter appears when the access is by the parent elementary data flow but in vain.

In the present invention, these selections may be automatically attained by using the same technique as Creator. The structure is the same as FIG. 14 but the verb dictionary 130 is replaced by a knowledge base. Referring information is a parent elementary data flow, and while accessing, the parent's input data 91 and the output data 93 are used with DDFT 196 to distinguish the meaning, and select one out of the candidates answered from the knowledge base and sends it to the CASE tool side. By this method, the work, that necessitates human selection in the conventional system, may be performed automatically to the extent that it is enough for usual cases.

Thus far, automation of software design, which is the central assignment of the present invention, is explained from analysis of human design, the principle of the solution, means and effects. Hereafter, several features of this intention are explained.

Besides automatic design related functions, it has a combined operation feature of the automatic design and the knowledge base for simple reuse. The automatic design requires many dynamic steps resulting in a long processing time. But, once it is generated for actual use of CASE tools 20, it stores in Knowledge base 10a, and for the later use, the immediate response by Knowledge base is used. In order to achieve this, a design knowledge generated automatically is sent back to CASE tool 20 with the automatic design command, and there is a path for sending it also to the knowledge base.

Integration unit 30 is provided with various means for plural CASE tools and also a multiplicity of engines. In order to assure synchronous operations of a multiplicity of engines, Integration unit 30 checks the coincidence of information from CASE tools.

When a designer draws the design by the data flow CASE tool, the results are sent to Integration unit 30, there it is converted to the corresponding structured chart information, and it is sent to the structured CASE tool 20c, and as a result PAD structured always follows the original data flow design automatically. Conversely, when the design by structured chart goes ahead of design by data flow, the inverse conversion is made, and data flows may be automatically drawn contributing the saving of man-hours.

As has been explained, by using actual applications of the present invention, following various ways of operations become possible.

This invented system begins from diagram drawing by a designer, using CASE tools 10, and then CASE tools 10 display the designed results. During these, this system can operate in various ways as usual CASE tools can do such as storing drawn results in files, and operating by reading them out or storing results as it is automatic designed and read them at a later time.

Salient feature of this invention is that this system is a unified system applicable to, from the early phase design to the last stage of design, and as this records both data flow and structured chart (flowchart) in small step of design thus this features the reduced error than that by all human design.

Furthermore, as this system can co-operate with a simple reuse system with knowledge base (The detail has been published in Japan Patent Laid-open no. Hei 10-320188), and its use with the automatic selection of the way of design of this invention, which saves man-hours needed for selecting the way of design in the past, enables the great man-hour saving (with small preparation man-hours) in the phase of so-called maintenance design, where repeated design are the main.

The system by this invention features higher degree of automatic design from the start, different from simple reuse, is possible by providing small numbers of Skeletons 131 and simple Methods 132 as fundamental design knowledge, the system creates higher level design knowledge than before. When basic knowledge is prepared in an area, this system can design automatically at a high degree of automatic design, which is quite different from simple reuse. Namely, the system by this invention features high adaptability to enable the best operation for the using.

The applications of this invention explained are the basic and fundamental structure, and further extensions in various ways are possible.

The aforementioned JSP unit collaborates with methods in Verb dictionary. But for a simple application, simpler ways are possible such as the central functions of JSP unit is assigned on each method.

In the aforementioned application, descriptions of model form and simplified form have been explained, but more high-level expressions than them are possible.

As the application of this invention, simple relationship cases of "Hour" and "Hour hand" using from FIG. 15 to FIG. 18A are explained, but in an actual applications there are cases where such simple relationship does not exists, and it is difficult to treat all the cases by methods. In such cases, another cognition unit may be provided with a dictionary defining elementary relationships with the processing logic to extend the range for recognizing the relationship by words, for recognizing the input side data (e.g. Hour) and the output side data (e.g. Bold hand). The system using Knowledge base may be regarded as one using "skill level" knowledge, and the system using Skeleton may be regarded as one using "rule level" knowledge, and such a system as using elementary knowledge may be regarded as one using "knowledge level". This system features capability to extend its effect to a large extent by a small cost of adding such as the aforementioned dictionary and its processing logic.

In FIG. 7 and FIG. 8, an application of this invention to use fixed format input and output forms and files, which are regarded to be Frame type memory having a root and they constitute Structure dictionary. It is frequently experienced that not only the structure but also the processing of forms. In such a case, the aforementioned Frame type memory is expanded to include not only data structure as data but also the processing logic (e.g. calculation of sub total) as its method.

As an example of this invention, a case where items, unit price, quantity, subtotal and the grand total are listed in the document, and they are processed by the method of Verb dictionary is explained. Prior to the processing, any input forms must be verified such as to confirm that it is registered in a master file. In such a case, one way is to extend the input of Skeleton in addition to the current input inherited from the parent concept include reference file as another input. (Similarly, in the output side of Skeleton, processing of a journal file, for recording the process history, may also'be added.)

Subtotal is verified by comparison of 'subtotal in the form' and 'unit price multiplied by the quantity'. Total is verified by comparison of 'Total in the form' and 'addition of all subtotals'. They may be processed by the methods read out from Verb dictionary, and that is more profitable.

Generally, printing of output forms use various reference information outside of the form. In such a case, each item in the output form (file) determines the reference information and the processing. If the input and the output of the parent are regarded as to define them and process them by method, invites a large method. But, as these details of such processing essentially depend on the output forms, it becomes possible to treat these data by methods provided for that data, to define each terms or to process outputs. In another way, it is an idea to provide an independent dedicated engine to collaborate with method of the engine. By such an arrangement, both Verb dictionary's as well as the Form's methods become simple.

Moreover, as application of this invention, Structure dictionary has been used. The case, where the input and the output are given, has been explained. Another case, where they are not fixed, may be treated as follows:

As a skeleton is abstracted as the experiences are repeated, the structures of the input data and the output data may also be fixed as the experiences are accumulated. Actually, the basic structure of the inputs and the outputs in the field of business data processing have been standardized as a result of years of experiences. Experts determine necessary input and output forms prior to the design of programs.

In designs, by a novice or in an un-experienced domain, the design starts from fundamental structures of forms and files, and expand it as the new needs arises. Likewise, it is possible to integrate a mechanism for updating and changing as design experiences are gained.

In explanations of applications of this invention, the most general natural language case has been shown, as symbol of the concept of human intelligent operations. Programs may be obtained when design information repeats hierarchical decomposition, and where they reach the most elementary level, by using design rules of natural language expressed parent to source code expression by programming language as the child. Expressions by non-natural language may also be used before that stage. For example, the statement "A square of hypotenuse is equal to the sum of the square of base and the square of vertical side" is equal to another statement "$S^2=Y^2+X^2$" (where S is hypotenuse, X is and Y is base). This results from the viewpoint of this invention, which is not the viewpoint of programming but human concept itself is taken based on human intentional activity.

This invention may be extended and upgraded. This corresponds to various levels of engines (for design), as has been pointed out by Zipf and Rasmussen.

According to Zipf's law, most of human works are simple and may be performed speedily, while low frequency high-level works are processed skillfully using a lot of times. Simple reuse corresponds the former, and automatic design using design rule does the latter. These have been attained as a result of the research strategy to learn and simulate human design in a bottom up manner. The simplest way was found at first, and the basic idea for the advanced way has been found later.

In aforementioned applications, simple reuse and the simplest way of automatic generation have been shown. It is possible to add more types of engines may be added on engines 10 connected to Integration unit 30 by the standardized interface.

By providing plural engines, it becomes possible to design more efficiently which is attained by collaborations of engines. By remembering automatically created design rules in knowledge base, after the second occurrence, the speed of design becomes much faster as it is simple reuse.

Indispensable function for this operation is to store automatically created design knowledge in Knowledge base. In the aforementioned example, design knowledge or design rule created automatically in Creator CASE tool 10*b* is stored in knowledge base 10*a*. As the functional interface 35 is standardized to be the same, various combinations of engines are possible. Learning human distributed processing nature, following system is possible: The parent concept is broadcasted to all the engines, and the earliest arrived answer is accepted for use. In the case of a single processor, simple reuse is first tried, and automatic design is tried in case the former is unavailable.

In case where magnetic memories are used due to the large amount of memories required for remembering knowledge to be reused, the time required for simple reuse might become large. In such a case, it is better not to depend on it too much.

The simplest solution of this problem is to use virtual memory. Namely, the memory system is organized to be multi-layered system, and frequently used design knowledge or the design rule is stored in a high speed main memory, while low frequency design knowledge or the design rule are stored in a magnetic memory, whose speed is slow but bit cost is inexpensive. This may be achieved by using built in mechanism of a computer.

It has been explained that the case where Skeleton and the method in this invention are prepared from the start of the use, which may be attained based on the existing designs on practical considerations. It is also possible to build an abstraction mechanism where actual experiences of design rules are abstracted to generate skeletons as frame and also methods may be generated by acquiring rules from the cases and patterns experienced.

When these are added to the aforementioned system and as a design rule is experienced by this abstraction mechanism, it increases the ability to design automatically as it experiences various ways, by abstracting and accumulating skeletons and methods.

Once such a mechanism becomes available, it is better to remember less number of thus abstracted skeletons and methods are equipped for reuse rather than to remember all of low frequency design rules as it appears for the simple reuse.

Figure 26:
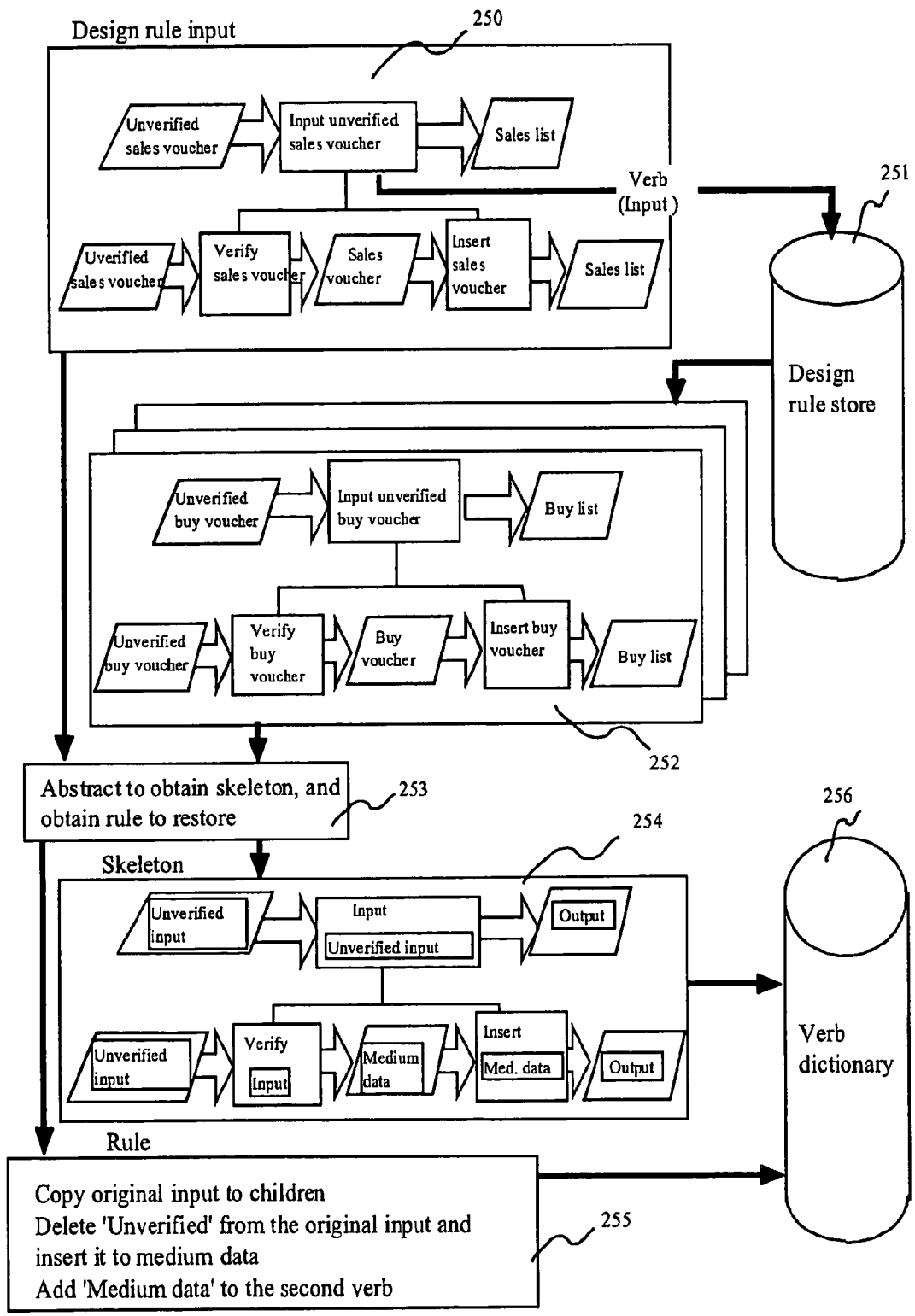
FIG. 26 Shows the creation processes of skeleton and method in the present invention.

FIG. 26 shows the detail, which is taken from FIG. 9 of a paper "Software creation: Clich. as intermediate knowledge in software design", Vol. 85.D. No. 1, pp 221-232, 2002. and shows the mechanism to create skeleton and methods. In the top left side a design rule 250 comes, which is designed by human designers or generated automatically by various engines. The verb part, -extracted from it, is sent to the design rule memory 251 and the memory is read. In the system of this invention, Knowledge base 10a may be used. 252, those who have the same verb, read out from the memory, are shown in the center of the figure. These and the previous just came design rule 250 are fed to a function "Obtain skeletons by abstraction, obtain rules to restore the original design rule" 253, and it compares with each other design rules. As a result of comparing Skeleton corresponding part of design rules, and abstracting the input data and the output data, a new skeleton 254, shown in the bottom of the figure, may be easily obtained. Also methods may be obtained similarly. The abstraction and the necessary rules to be applied are simple as the variations are few. Thus created pair of a skeleton and the method is accumulated on verb dictionary 256.

Figure 27:
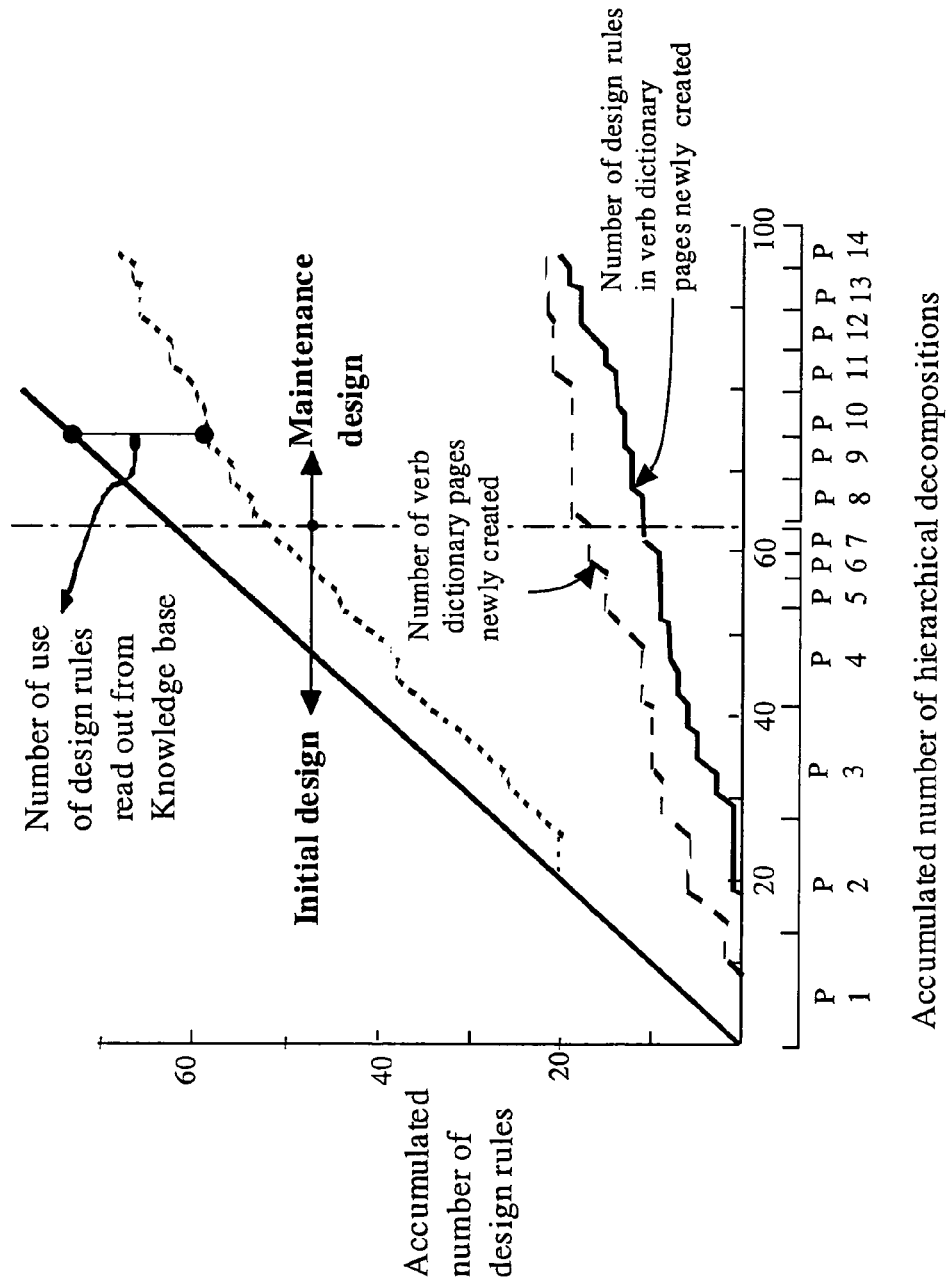
FIG. 27 shows the effect in the case of an inventory control.

FIG. 27 shows the results of the effectiveness study based on the actual designs on a simple inventory control system. The horizontal axis shows the accumulated number of experienced hierarchical decompositions during design, and the vertical axis shows the numbers of design rules. The curve shown by broken line in the bottom area of the figure shows the total number of the dictionary pages generated by the aforementioned way, and the curve shown by solid line is the accumulated number of generating a design rule referring to thus prepared dictionary. It is seen that this curve almost linearly grows. These show that even simple mechanism is effective by Learning Effect.

Thus storing all the information in Knowledge base, not only the system can design much faster but also creates higher-level both ability and knowledge by abstracting experiences. Integrated Intelligent CASE tool that is enriched by such intelligent function increases the ability from the low level knowledge to the higher-level knowledge as designers use it. It is a result that this system bases on the same basis as human knowledge.

In the system shown in FIG. 6, design rules generated by all the engines 10 are sent back to CASE tools 20. At the same time, The standard interface 35, through which the information flows, flows the design rules to the abstraction mechanism as shown in FIG. 26, and the verb dictionary shown in the figure is used commonly with the engine for the automatic generation of design rules.

As these show, the system by this invention includes the mechanism of Learning of human designers.

These optimization of each function unit, such as one for reuse, another for automatic generation and the mechanism for the abstraction, may be customized in various ways by considering human design.

This hierarchical decomposition of concepts is the most fundamental human intellectual operations. Up to now, mainly software design cases have been explained, but it is clear that this method may be further expanded to design in general. An example now used is hardware logic design, where high-level language using programming language, is widely used. Another is the design of super computers, where such means are taken, and the works there has reached to the very near level as programming. The most familiar example is a fact that the design of clock in FIG. 1 may be readily applicable to hardware design. Explanations, shown here, are mainly software, and various studies are now being made in the area of business process, where it is regarded as a kind of software. Business flow used there are essentially the same as data flow. In a high level, where the problem there are rather abstract such as the information itself or the states, and as it goes down it becomes more solid and concrete, and there are no definite intersection. Data described up to now in this invention may be applied there. Necessary man-hours are larger in the down stream area, such as programming phase, than high level area, when seen from a view point of hierarchical decomposition, from the top management level down to coding at the final end, this invention enables to treat all in the same way resulting in a unified system.

As has been these discussed, automatic generation of design knowledge may be applicable to all the human intentional activities.

Furthermore, the quantitative evaluations of applications of this invention are explained. Namely, as design rule shows a Learning Effect, therefore the evaluations may be quantitatively made by using Learning Effect Engineering on the progress of automation and decrease of man-hours for design by the automation.

Figure 20:
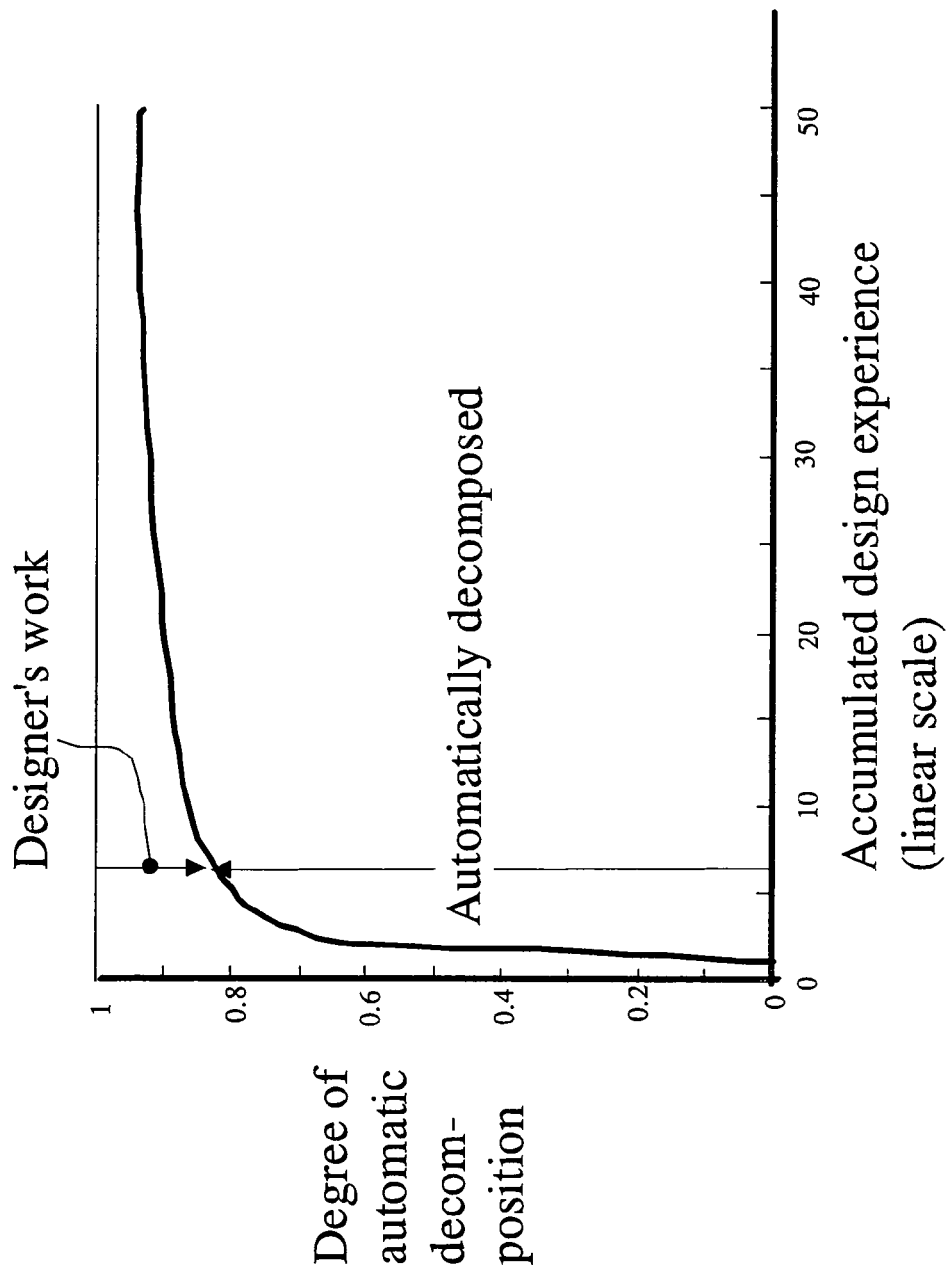
FIG. 20 shows the evaluation result of automatic design experiment using reuse in the present invention, showing how much are performed automatically in percent, the horizontal axis shows the number of times of repeating similar design in an area, while the vertical axis shows the degree of automatic detailing.

FIG. 20, cited from FIG. 7b of a paper "Software Creation: An Intelligent CASE Tool Featuring Automatic Design for Structured Programming, IEICE Trans., Vol. E81-D, No. 12, pp. 1439-1449, December, 1998, shows such result of detailed studies on the system, where design knowledge is acquired automatically from past designs, the design knowledge is stored in knowledge base, and is reused for automatic design. As the system, using this invention, automates design by storing design knowledge and then reusing it, the evaluation has been made on an example of maintenance design phase. The horizontal axis shows starting from the initial design and then following maintenance design, the vertical axis shows the percentage of automatic hierarchical detaining made automatically.

The curve grows rapidly at first, and at 10th design more than 80% are designed automatically. Learning Effect causes this, and relatively few design knowledge is used repetitively. However, after many times of designs, the curve does not reach 100%. This shows that simple reuse has its limitation as its low level intelligence.

This invention uses not only structured chart but also data flow is used, and it extends the applicable range toward earlier phase than programming, and it brings substantial effects more than shown in the figure. Namely, this brings large effects from the early phase design to the lowest phase.

Figure 21:
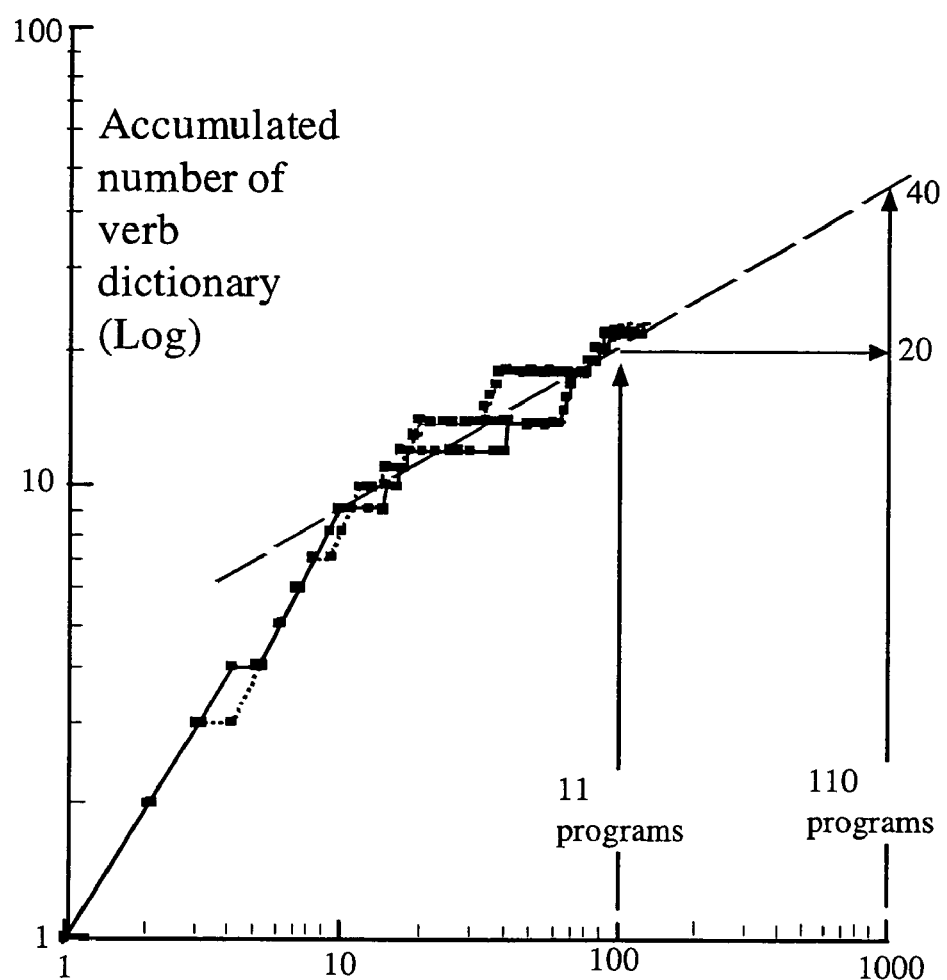
FIG. 21 shows another result of the evaluation in the case of automatic generation of design knowledge, the horizontal axis shows the accumulated number of design experiences of hierarchical decompositions, and the vertical axis shows the accumulated number of verb dictionary pages as needed for design, both in Logarithmic scales.

FIG. 21 shows the evaluation in the case of where only Creator is used or automatic designs made by only automatic design of creating design knowledge. The horizontal axis shows the number of hierarchical decompositions experienced designs, and the vertical axis is the accumulated number of pages of Verb dictionary, and they are shown on both Logarithmic scales. In this figure, Learning Effect appears as a liner trend line. The evaluation using the second trend line is made on a following experimental case. The design was 500 lines of code or 11 programs namely 100 hierarchical decompositions, and it necessitated 20 pages of verb dictionary. From FIG. 21, the estimation has been made using the second trend line. The case is to design additional 5000 lines of code, or 110 programs, which requires 1000 hierarchical decompositions. The total number of the pages of Verb dictionary is estimated to be 40 pages or addition of 20 pages. This means that, during the design, 20 hierarchical decompositions out of 1000 hierarchical decompositions of total design needs to add 20 verb dictionary pages. This may be evaluated that the degree of automatic design is 98%. As is shown, automatic designs by this invention features high degree of automatic design and it shows that a salient increase of the productivity.

Besides this evaluation of the effectiveness, there is another evaluation on preparation cost for the automation. The preparation cost of this system consists of a fixed cost for such as Creator CASE tools and the variable cost such as the cost for a page of verb dictionary multiplied by the number of pages needed. As has been explained earlier, the fixed cost part is Creator CASE tool 10b where the main functional parts are only Verb dictionary 130 and DDFT 196, and thus as the necessary additional part is much smaller than conventional systems. The variable cost part; Verb dictionary 130 is a fundamental component of the system, which requires only small number of pages, compared with conventional automatic design systems, which requires a large amount of design knowledge are necessary, this system requires much smaller amount of knowledge is needed and necessary work for the expansion may be performed by small amount of skeleton and method per page. Thus, this invention features the low start up cost for enjoying automatic design.

The automatic design system using knowledge base, explained in the beginning, is "Skill level" system by Rasmussen's definition, and the system, using skeleton, is "Rule level" system. The last of his definition is "Knowledge level" system. When they are integrated into the system, various problems, which have been impossible to solve by the present system, may be solved. The basic technology is reported in detail in a paper "Software Creation: A study on the inside of human design knowledge, IEICE Trans., 83.D, Vol. 4, pp. 648-658. Some relating to this are explained.

The center of "Knowledge level" operations exists on basic knowledge dictionary, which consists of dictionary type knowledge of definitions of concept, data structure, forms, verbs and so on. There are micro design rules (elemental function logic), which perform elementary intellectual processing by using the aforementioned dictionaries.

Simple explanation on them is as follows: JSP type design has been explained using from FIG. 15 to FIG. 18A. Various methods read out from Verb dictionaries work with dedicated processing logic to perform typical operations as shown in these figures. In case when these processing cannot attain objects, micro design rules (elemental function logic) works to establish various relations by using the these dictionaries.

Namely, in case where the parent's input data and the parent's output data are hierarchically decomposed to form each combinations, if Hands are decomposed to "Bold hand", "Long hand" and "Fine hand", the relation between one of the group of decomposed children data from "Time" and one of the group of decomposed children data from "Time" can not establish the mutual relationship. If concept dictionary includes definitions of "Bold hand" and "Hour", "Long hand" and minute and "Fine hand" and "Second", micro design rule Concept definition (CDC) works using the basic knowledge dictionary to find the corresponding relations between both sides children data.

As is shown, where methods are impotent, the operation mode is upgraded to "Knowledge level" and micro design rules become the key player for the processing. In the preceding explanation on FIG. 15, "Time" and "Hands" are decomposed hierarchically to their children using Structure dictionary. In case when these decompositions are not be made as shown in FIG. 17, micro design rule UCS "Up-warding Correspondence" can establish the relations referring to data definitions in basic knowledge dictionary. The insertion of the suitable description, inheriting the children concept's verb part, in the phantom function box of the children concept may be backed up by a micro design rule CFN (Create Function Name). There are other micro design rules, CAB (Concept Abstraction), SIO (Select I-map and O-map) and so on. In case usual operations cannot work, especially establishing relations, they search for all the possible solutions by referring to basic knowledge dictionary.

Thus, these micro design rules work to expand the range, where the engine can design, drastically.

One application is a follows: In an engine as shown in FIG. 19, aforementioned basic dictionary is provided and aforementioned their processing logics are provided, and they perform each micro design rule functions. In case where methods from Verb dictionary or dedicated processing logic, as shown in FIG. 16 to 17, cannot establish relations between the input and output data, micro design rules work collaborating with each processing logics.

Figure 28:
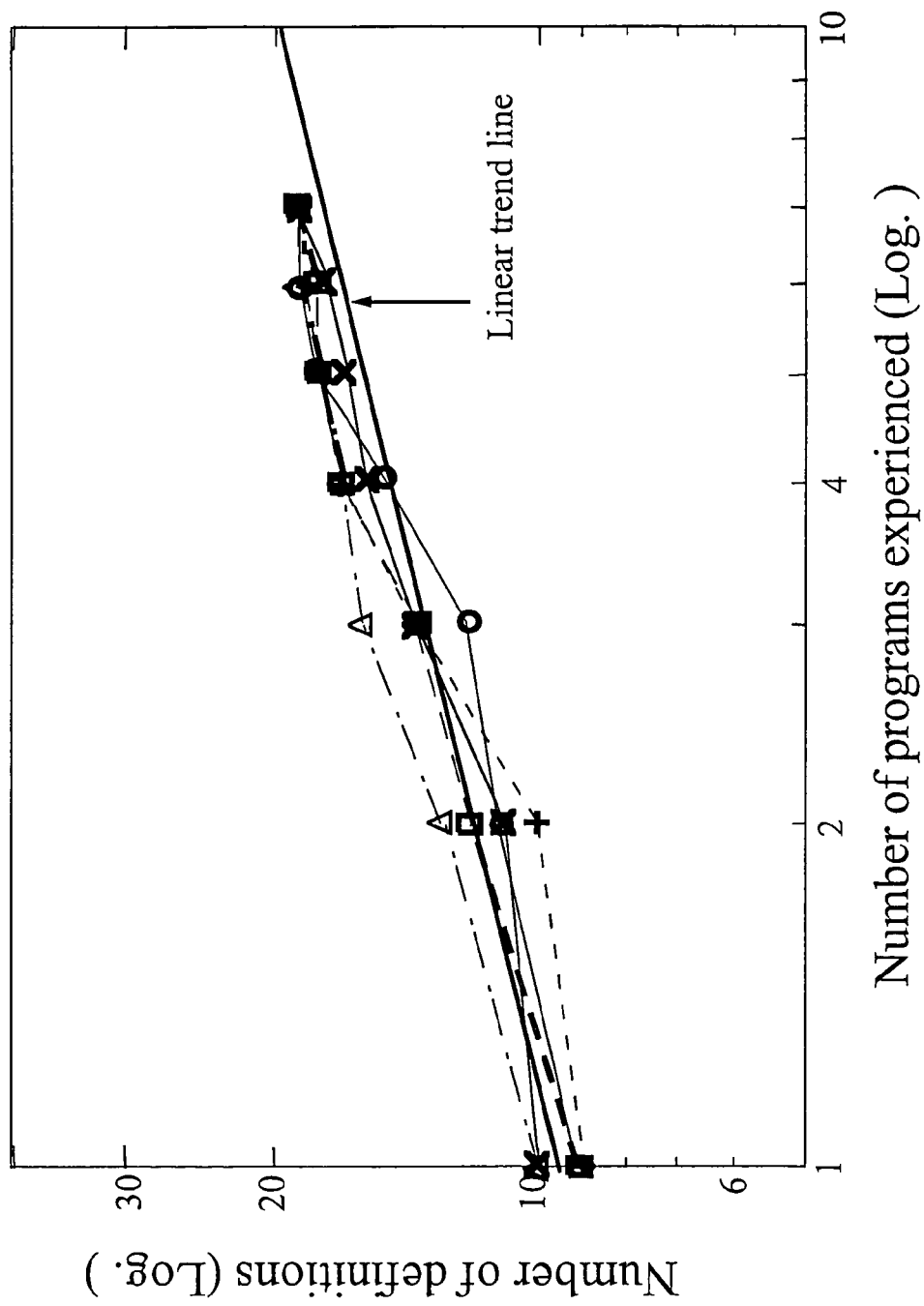
FIG. 28 shows the relationship between the seven programs and the accumulated number of definitions.

The initial design, of 7 programs of Inventory programs explained in FIG. 27, have been made in various sequences, and FIG. 28 shows the accumulated number of definitions in the vertical axis and the number of the program designed as shown in the horizontal axis. Various sequences of 7 programs are shown in various curves. As is shown, they clearly show Learning Effects. Namely, although the number of the program increases, the number of definitions increases gradually. In other words, if a small number of definitions increase, the number of designable programs increases rapidly, or the increase is Logarithmic.

Consider the case Verb dictionary, where it is combined with skeletons. A skeleton may be regarded as to add some symbols of positions, where words are to be inserted, of a verb, and methods are to form patterns of a verb considering 5W 1H. When typical grammatical knowledge is added on a verb, each page of Verb dictionary may be prepared. Similarly, Structure dictionary to be used with skeleton may be generated from structural data of data structure or forms are given.

It means that from aforementioned dictionaries, a variety of knowledge, needed in skeleton system may be developed. Conversely, basic knowledge to work with micro design rule may be prepared from Structure dictionary and Verb dictionary. The situation is quite the same as design rules may be abstracted to skeleton and methods.

The actual system is explained as follows: Among various ways, "Abstract to obtain skeleton" 253 in FIG. 26 creates a skeleton from several design rules. Here, children concepts are formed from a parent function, which may also be stored in basic dictionary.

These arise from the fact that this invention creates the models of functional structure of human brain, which has been optimized through historical long years and genetically. This invention may not only be applicable to design but also human intentional activities in general. Examples are automation of so-called business processes, which is a much earlier phase design of design of a software system, and automatic design of hardware. A humanoid is a robot that is provided with human-like intelligence. This invention may be used there as the central system for the intelligence. A conventional way is that the program for a robot is designed apart from the robot, and then the program is supplied to the robot to perform what is designed. In this system, starting from the original intention (e.g. to look right side), the intention is detailed finally to a command to drive various actuators (implementation means).

Using FIG. 6, operations are explained. During software design, there is the designer in the left side, who designs using CASE tool 20 with its automatic design functions. After the design, the resultant source code in the form of a file is taken out of this CASE tool, converted to working file by a compiler, and the working file is fed to a computer to run.

In applying a robot, this system works as follows: Inputs from the external world are detected by various sensors, processed, and judged. Up to this point is like the aforementioned designer, which is out side of this system. After when the robot has the intention "Look right side", this system is responsible. As a designer indicates his/her intention to the CASE tool, the intension is indicated to the CASE tool. As has been shown in the case of "Clock", it is then detailed hierarchically until detailed commands for each actions of the human body, which are implementation means in this case. But, here without compiling or after compiling, results are directly converted to commands to actuators in the body. Thus the robot begins to move.

Functions of the CASE tool for these use operate virtually. In the development of the robot or the function for it, CASE tool functions may be used, to observe the detailing process at on-line basis, to control the detailing process such as to alter, or directly change. These have not been possible before.

In this invention, the application to software development has been explained in detail as the most simple and the most realistic case, and the principle of an application has been referred to as an example of human achievements to attain the intention. In between these two examples, there may be various applications, and this invention may be used by the concept of "achievements of intention" in all cases.

From these, this invention features its excellent cost per performance for attaining design or the achievements of intention and a wide applicability to any human intentional activities in general. This system also features capability of Learning by storing "skill level" knowledge directly, abstracting experiences to "rule level" knowledge and storing them in verb dictionary and further abstracting them and accumulating "knowledge level" knowledge in basic dictionary, like a novice is trained by experts to gain knowledge and to advance own technology and capabilities.

INDUSTRIAL APPLICABILITY

As has been described, the present invention as applied to automatic creation method of design knowledge and the program as well as the automatic design method and the system is fitted not only to actual program, software, software system and business system, but also further extensible to those systems such as robot, that behaves like a human who details or decomposes from the given object in an early phase to last stage such as to convert the given function to source code and to apply for automatic decomposing or design and design supports of human design.

The present invention also enables to reduce works by automating them, namely, increases the productivity. Or in another words, human work for a hierarchical decomposition requires at least order of minute, however, when automated it would be performed order of second at the worst case. Thus, these effects are brought by the automation.

Also, the present invention enables an automatic design at a high degree of automatic design, by creating design knowledge automatically and by accumulating it to knowledge base and reconstructing the knowledge base.

Also, the present invention enables to integrate use of various engines for design, and a system for document preparations and displays.

The invention claimed is:

1. An automatic creation system for hierarchically decomposing automatically from a system input expressed by an elementary data flow to a system output expressed by a detailed data flow, being decomposed hierarchically from said system input, comprising:

a parent data flow diagram (DFD) register for said system input;
a memory subsystem;
an engine subsystem; and
a designed DFD children register for said system output,
wherein said elementary data flow includes:
input data including data or a previous status;
a function for receiving and processing said input data; and
output data including data processed or the status after processing by said function,
wherein said function has a verb defined by conversion from said input data to said output data,
wherein all of said input data, said function and said output data have their own description in at least one of natural language, mathematical expression, programming definition and symbol,
wherein said detailed data flow is defined by a single or multiple of said elementary data flow,
wherein said memory subsystem includes:
a verb dictionary for creating said detailed data flow decomposed from said elementary data flow in said parent DFD register;
a verb dictionary unit for keeping said verb dictionary; and
a DDF (design direction finder) table for specifying said verb dictionary; and
wherein each said DDF table corresponds to each of said verb used within said function in said elementary data flow in said parent DFD register, and each said DDF table includes a single or multiple dictionary identification composition(s) related to each meaning of said verb,
wherein each said dictionary identification composition includes at least:
specifying input data which is obtained from said input data of said elementary data flow in said parent DFD register or "don't care" sign for ignoring said input data;
specifying output data which is obtained from said output data of said elementary data flow in said parent DFD register or "don't care" sign for ignoring said output data; and
a dictionary indication,
wherein said dictionary indication of said dictionary identification composition of said verb is link information to said verb dictionary to be used for creating said detailed data flow,
wherein said verb dictionary includes:
a skeleton which includes a DFD skeleton of said detailed data flow decomposed from said elementary data flow in said parent DFD register; and
a method entry for designating a method for a processing sequence to complete said detailed data flow based on said DFD skeleton,
wherein said DFD skeleton is a single or multiple of said elementary data flow, as decomposed hierarchically from said elementary data flow in said parent DFD register, and has at least each verb in each function in said elementary data flow,
wherein said engine subsystem includes:
an access preparation unit for which said verb is extracted for access from said function in said elementary data flow in said parent DFD register;
a DDF table access unit which accesses said DDF table based on said extracted verb, for said dictionary indication for said verb dictionary;

a verb dictionary extraction unit which extracts said verb dictionary from said verb dictionary unit on said extracted verb and said dictionary indication of said dictionary identification composition of said DDF table corresponding to said extracted verb; and an automatic creation unit which reads out said method for said processing sequence to complete said detailed data flow in said designed DFD children register, based on said DFD skeleton wherein both said method entry for designating said method for said processing sequence and said DFD skeleton are in said extracted verb dictionary by said verb dictionary extraction unit corresponding to said elementary data flow in said parent DFD register, and wherein, in order to specify said dictionary indication for said verb dictionary, said DDF table access unit examines concurrency for all dictionary identification compositions(s) in said DDF table for said extracted verb, on said input data and said output data, both in said elementary data flow in said parent DFD register, and said specifying input data and said specifying output data, both in said DDF table respectively, and extracts said dictionary indication of said dictionary identification composition upon basis of examined said concurrency.

2. The automatic creation system, as described in claim 1, comprising a designed PAD (Problem Analysis Diagram) children register for said system output, wherein said system output is expressed also by a flowchart or a structured chart, wherein said flowchart or said structured chart includes single or multiple of said function of said detailed data flow in order of an execution sequence of said flowchart or said structured chart, wherein said skeleton includes a PAD skeleton of said flowchart or said structured chart corresponding to said detailed data flow, is composed of a single or multiple of said function of said detailed data flow, and is described in order of said execution sequence as children, and wherein said automatic creation unit creates said flowchart or said structured chart in said designed PAD children register.

3. The automatic creation system, as described in claim 1, comprising a JSP (Jackson Structured Programming) unit part, wherein said JSP unit part includes:

a structure dictionary in said memory subsystem, for defining all data, hierarchically, including a voucher or a file being at the top, each data being placed on a node and a final data being an end leaf of a branch;

a pair of an input data work register and an output data work register, both including multiple child registers, each of said child registers storing said input data or said output data respectively; and a prototype DFD skeleton work register, including multiple child registers for each said elementary data flow, each of said child registers storing said input data, said output data and said function between them, wherein said JSP unit part performs the following:

a first processing logic operation, for referring to said structure dictionary with said input data of said parent DFD register, developing hierarchically decomposed children data in said child registers of said input data work register, referring to said structure dictionary with said output data of said parent DFD register, and developing hierarchically decomposed children data in said child registers of said output data work register;

a second processing logic operation, establishing one or multiple temporary elementary data flow(s) with a blank function in said prototype DFD skeleton work register; and a third processing logic operation, for recording one or multiple completed elementary data flow(s) in said designed DFD children register, by copying one or multiple said temporary elementary data flow(s) in said prototype DFD skeleton work register, by inserting each blank function with said verb in said function of said elementary data flow(s) in said parent DFD register or said verb in a child function from said DFD skeleton in said verb dictionary extracted by said verb dictionary extraction unit, and wherein, in said second processing logic operation, said paired input data, being copied from said child registers of said input data work register, and output data, being copied from said child registers of said output data work register, have a correspondence, and said correspondence is established by checking all possible pairs of said input data of said child registers of said input data work register and said output data of said child registers of said output data work register.

4. The automatic creation system, as described in claim 1, comprising a designed PAD (Problem Analysis Diagram) children register for said system output, wherein said system output is expressed also by a flowchart or a structured chart, wherein said flowchart or said structured chart includes single or multiple of said function of said detailed data flow in order of an execution sequence of said flowchart or said structured chart, and wherein said method for processing sequences includes creating said flowchart or said structured chart by copying each function of said detailed data flow in order of appearance, and thereby creating said flowchart or said structured chart in said designed PAD children register.

* * * * *